(12) United States Patent
Dunn, Jr. et al.

(10) Patent No.: US 10,959,051 B2
(45) Date of Patent: Mar. 23, 2021

(54) SYSTEM AND METHOD FOR CREATING, STORING AND DELIVERING SELF-GUIDED AUDIO TOURS

(71) Applicants: Gregory J. Dunn, Jr., Boston, MA (US); Audrey Markoff Dunn, Boston, MA (US)

(72) Inventors: Gregory J. Dunn, Jr., Boston, MA (US); Audrey Markoff Dunn, Boston, MA (US)

( * ) Notice: Subject to any disclaimer, the term of this patent is extended or adjusted under 35 U.S.C. 154(b) by 0 days.

(21) Appl. No.: 16/832,909

(22) Filed: Mar. 27, 2020

(65) Prior Publication Data

US 2020/0314592 A1    Oct. 1, 2020

Related U.S. Application Data

(60) Provisional application No. 62/824,495, filed on Mar. 27, 2019, provisional application No. 62/829,215, (Continued)

(51) Int. Cl.
*H04M 1/60* (2006.01)
*H04W 4/02* (2018.01)
(Continued)

(52) U.S. Cl.
CPC ......... *H04W 4/024* (2018.02); *H04M 1/6016* (2013.01); *H04W 4/026* (2013.01); *H04M 2250/10* (2013.01); *H04W 4/021* (2013.01)

(58) Field of Classification Search
CPC ..... H04W 4/024; H04W 4/026; H04W 4/021; H04M 1/6016; H04M 2250/10
See application file for complete search history.

(56) References Cited

U.S. PATENT DOCUMENTS

| | | | |
|---|---|---|---|
| 2010/0063726 A1* | 3/2010 | Marjenberg | G01C 21/00 701/408 |
| 2014/0248911 A1* | 9/2014 | Rouda, Jr. | H04W 4/021 455/456.3 |
| 2017/0351481 A1* | 12/2017 | Raphael | H04W 4/21 |

* cited by examiner

*Primary Examiner* — Joseph E Dean, Jr.
(74) *Attorney, Agent, or Firm* — Pandiscio & Pandiscio

(57) ABSTRACT

A system for delivering a self-guided audio tour to an end user, the system comprising: a central server comprising: a database; a tour instruction file stored in the database, the tour instruction file comprising: a tour type; a tour path comprising a plurality of tour points; an order of the tour points on the tour path; location information identifying the real-world position of each of the tour points on the tour path; and data to be delivered to the end user for each of the tour points on the tour path; and a personal electronic device comprising: a central processing unit; a wireless transceiver in communication with the central processing unit for wirelessly communicating with the central server; a position determination unit in communication with the central processing unit for identifying the real-world position of the personal electronic device; a display in communication with the central processing unit; at least one acoustic output unit in communication with the central processing unit; and a software app running on the central processing unit for: using the position determination unit to identify the real-world position of the personal electronic device; comparing the real-world position of the personal electronic device with the tour path to determine if the personal electronic device is located at one of the plurality of tour points; if the end user is at one of the plurality of tour points, and if the end user reached that tour point following the order of the tour points on the tour path, delivering the data from the tour instruction file for that tour point.

22 Claims, 28 Drawing Sheets

Related U.S. Application Data filed on Apr. 4, 2019, provisional application No. 62/829,204, filed on Apr. 4, 2019, provisional application No. 62/844,207, filed on May 7, 2019, provisional application No. 62/902,549, filed on Sep. 19, 2019.

(51) Int. Cl.
*H04W 4/024* (2018.01)
*H04W 4/021* (2018.01)

SYSTEM AND METHOD FOR CREATING, STORING AND DELIVERING SELF-GUIDED AUDIO TOURS

REFERENCE TO PENDING PRIOR PATENT APPLICATIONS

This patent application:

(i) claims benefit of prior U.S. Provisional Patent Application Ser. No. 62/824,495, filed Mar. 27, 2019 by Gregory J. Dunn, Jr. for ADVANCED DATA TRIGGER MOBILE TOUR DELIVERY SYSTEM—GPS;

(ii) claims benefit of prior U.S. Provisional Patent Application Ser. No. 62/829,215, filed Apr. 4, 2019 by Gregory J. Dunn, Jr. et al. for ADT MOBILE TOUR PUBLISHING PLATFORM;

(iii) claims benefit of prior U.S. Provisional Patent Application Ser. No. 62/829,204, filed Apr. 4, 2019 by Gregory J. Dunn, Jr. for ADVANCED DATA TRIGGER MOBILE TOUR DELIVERY SYSTEM—BLUETOOTH APPLICATIONS;

(iv) claims benefit of prior U.S. Provisional Patent Application Ser. No. 62/844,207, filed May 7, 2019 by Gregory J. Dunn, Jr. for INTERACTIVE AUGMENTED REALITY DATA DELIVERY STYLE CHOICE OPTIONS FOR ADVANCED DATA TRIGGER MOBILE TOUR DELIVERY SYSTEM—GPS/BLUETOOTH; and (v) claims benefit of prior U.S. Provisional Patent Application Ser. No. 62/902,549, filed Sep. 19, 2019 by Gregory J. Dunn, Jr. for TOUR BY NUMBERS MOBILE TOUR SOLUTION WITH SOUND INNOVATION AND AUDIO TEXT-TO-AUDIO TRANSLATION INNOVATION FOR MOBILE TOURS.

The five (5) above-identified patent applications are hereby incorporated herein by reference.

FIELD OF THE INVENTION

This invention relates to self-guided audio tours in general, and more particularly to a novel system for creating, storing and delivering a self-guided audio tour to an end user.

BACKGROUND OF THE INVENTION

Self-guided audio tours using portable electronic devices to deliver the tour to an end user are known, however, conventional self-guided audio tours suffer from several significant disadvantages.

By way of example but not limitation, conventional self-guided audio tours typically rely upon the use of a proprietary handset which the end user carries during the tour, and into which the end user enters numbers that are keyed to a particular location/exhibit so that the handset plays the audio associated with that particular exhibit.

The use of proprietary handsets requires (i) the programming and maintenance of the handsets, (ii) end user interaction to operate the handset (i.e., the end user must locate the appropriate number for a particular exhibit and manually input the appropriate number into the handset), and (iii) maintenance and management of the handsets (e.g., charging, programming, lending out to end users, cleaning, etc.). Furthermore, such systems do not ordinarily provide any way to direct the end user from one location/exhibit to another location/exhibit.

It is known in the prior art to use global positioning system (GPS) coordinates and GPS-linked maps to guide end users on self-guided audio tours, however, such prior art GPS-based systems also suffer from significant drawbacks.

By way of example but not limitation, GPS signals can be inaccurate (or non-existent) when the receiver is located indoors, when metal objects are near the receiver, when the receiver is disposed within a case (e.g., within a smartphone case), when buildings reflect GPS signals, when atmospheric changes or weather affect the GPS signal, and/or locations/exhibits on a particular tour path can be disposed so close together that GPS signals are not accurate for discriminating between particular locations/exhibits, and hence such a prior art system may misidentify the location/exhibit that the end user is actually viewing when the system relies on GPS coordinates to make the determination of position (i.e., the end user is at the second stop of a tour, but the GPS receiver erroneously concludes that the end user is two blocks away at the fourth stop, and the GPS-based tour plays the fourth stop rather than the second stop, since the GPS erroneously concluded that the end user was at the fourth stop.

In addition, when an end user is undertaking a self-guided audio tour that relies on GPS coordinates to identify locations/exhibits on the tour, and when the end user is in the space between two exhibits (e.g., in a gallery of a museum with painting exhibits on different walls), the GPS coordinates may correctly identify the gallery, but will not be able to identify which exhibit the user is viewing. As a result, since such a prior art system does not know the orientation of the user, the system cannot guide the user from one exhibit to another exhibit.

In addition to GPS, some prior art systems utilize localized beacons (e.g., BlueTooth beacons) that identify when a user is in proximity to a Bluetooth beacon and play the appropriate audio file for that particular Bluetooth beacon.

However, where prior art systems utilize BlueTooth beacons to identify a particular exhibit, such systems suffer from being unable to discriminate between BlueTooth beacons having overlapping zones, and hence such systems can misidentify an exhibit and play the incorrect audio relative to the exhibit that the user is actually viewing.

In addition, prior art systems deliver only "static" audio to the end user, that is, audio that is unrelated to the actions and movement of the end user. In this respect, the "static" audio of prior art systems is not varied to reflect the direction that the end user is facing vis-à-vis the location/exhibit being described, and the "static" audio delivered to the end user is unrelated to the end user's distance from the exhibit being described, etc., since the prior art systems do not know orientation of user vis-à-vis the location/exhibit being described.

Such prior art systems also generally require the end user to listen to an entire audio file before moving on to next exhibit, or such systems continue playing the same audio file despite the fact that the end user has moved to a different exhibit, thereby confusing the end user.

In addition, when developing the tours, the tour creator lacks the choice of audio styles that are delivered at each location. The tour creator is only presented with one choice, a pre-defined audio file that plays until it is presented with a new location trigger. This single pre-defined audio style (i.e., "one size fits all" for every location) creates limitations. The present invention allows for tour creators to choose various audio styles to suit the environment and story.

In addition, with current systems, the tour creator has no option to expand on current location stories. The end user must listen to the entire story no matter how long. There is no "addition option" to expand on the story. With the present invention, the tour creator can easily build in a choice for the end user to expand on the story, if they so choose.

And, with prior art systems, the audio that is delivered to the end user is played either through headphones or through a main speaker only. The requirement that the end user wear headphones isolates the end user from others (and/or causes a potentially hazardous distraction, such as when engaging in a tour outdoors, crossing streets, etc.), and the use of a main speaker can be disruptive in indoor environments (e.g., a museum), and particularly when multiple users are undertaking tours simultaneously.

Finally, it should be appreciated that where proprietary handsets or proprietary software (e.g., existing third-party apps) are used to deliver a self-guided audio tour, such systems are not easy to distribute across different platforms (e.g., different operating systems such as iOS, Android, etc.), and encumbers the end user by forcing the end user to either utilize proprietary hardware (e.g., handsets), or download proprietary apps (e.g., third-party apps) to run on the user's own portable electronic device (e.g., a smartphone). Hence, apps need to be developed and maintained for multiple platforms (e.g., iOS, Android, etc.).

Furthermore, apps are typically location-specific and developed by third parties for those particular locations. By way of example but not limitation, a user may need to download a "Museum of Art" app when visiting the Museum of Art to run a self-guided audio tour on the user's smartphone, and then the user may need to download an entirely different app when visiting a different museum (e.g., a "Museum of Science" app when visiting the Museum of Science, a "Museum of History" app when visiting the Museum of History, a "Freedom Trail" app when walking the Freedom Trail, etc.). Requiring different apps for different locations (and requiring the user to download and install such apps) is a significant drawback of prior art systems, and makes it difficult for tour creators to distribute tours to users.

Also, with current apps that provide GPS tours or provide museum tours, these apps only provide one type of tour. There is no software solution that allows a tour creator to create multiple types of tours (i.e. GPS tours, Bluetooth tours, tour-by-number tours, virtual tours, etc.) and publish them to a marketplace app that provides many tour experiences to end users on multiple platforms (e.g., iOS, Android, etc.)

Thus there is need for a new and improved way to create novel audio tours and a new and improved way to store and deliver novel audio tours to the personal electronic device (e.g., a smartphone) of a user which avoids the difficulties of the prior art.

SUMMARY OF THE INVENTION

The present invention comprises a new and improved way to create novel audio tours, and a new and improved way to store and deliver novel audio tours to the personal electronic device (e.g., a smartphone) of a user which avoids the difficulties of the prior art.

In one form of the invention, there is provided a system for delivering a self-guided audio tour to an end user, said system comprising:
  a central server comprising:
  a database;
  a tour instruction file stored in said database, said tour instruction file comprising:
    a tour type;
    a tour path comprising a plurality of tour points;
    an order of said tour points on said tour path;
    location information identifying the real-world position of each of said tour points on said tour path; and
    data to be delivered to the end user for each of said tour points on said tour path; and
  a personal electronic device comprising:
  a central processing unit;
  a wireless transceiver in communication with said central processing unit for wirelessly communicating with said central server;
  a position determination unit in communication with said central processing unit for identifying the real-world position of said personal electronic device;
  a display in communication with said central processing unit;
  at least one acoustic output unit in communication with said central processing unit; and
  a software app running on said central processing unit for:
    using said position determination unit to identify the real-world position of said personal electronic device;
    comparing said real-world position of said personal electronic device with said tour path to determine if said personal electronic device is located at one of said plurality of tour points;
    if the end user is at one of said plurality of tour points, and if the end user reached that tour point following said order of said tour points on said tour path, delivering the data from said tour instruction file for that tour point.

In another form of the invention, there is provided a method for delivering a tour to an end user, wherein the tour comprises a tour path comprising a plurality of tour points, an order of the tour points on the tour path, location information identifying the real-world position of each of the tour points on the tour path, and data to be delivered to the end user for each of the tour points on the tour path, said method comprising:
  identifying the real-world position of the end user;
  comparing said real-world position of the end user with the tour path to determine if the end user is located at one of the plurality of tour points; and
  if the end user is at one of the plurality of tour points, and if the end user reached that tour point following the order of the tour points on the tour path, delivering the data for that tour point to the end user.

In another form of the invention, there is provided a method for creating a tour instruction file to be used on a personal electronic device to provide a self-guided audio tour to an end user, said method comprising:
  defining a tour path comprising a plurality of tour points having a sequence;
  for each of said plurality of tour points on said tour path, defining:
    a sequence number for that tour point;
    a real-world location for that tour point;
    a data file to be delivered to the end user when the end user is positioned at that tour point; and
  storing the tour instruction file in a central database.

In another form of the invention, there is provided a computer program product embodied in a non-transitory computer-readable medium for creating a tour instruction file to be used on a personal electronic device to provide a self-guided audio tour to an end user, the computer program product comprising code which causes one or more processors to perform the operations of:
  querying a tour creator to define a tour path comprising a plurality of tour points having a sequence, wherein, for each of said plurality of tour points on said tour path, further querying the tour creator to define for that tour point:
a sequence number for that tour point;
a real-world location for that tour point;
a data file to be delivered to the end user when the end user is positioned at that tour point; and
storing the tour path in a database.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE PREFERRED EMBODIMENTS

1. Novel System for Creating and Distributing Mobile Tours

The present invention provides a new and improved way to design novel audio tours and a new and improved way to deliver novel audio tours to the personal electronic device (e.g., a smartphone) of an end user which avoids the difficulties of the prior art.

The present invention enables the creation of a mobile tour instruction file defining a particular self-guided audio tour which can be stored on a central server (which is preferably connected to the Internet), such that any end user with a portable electronic device (e.g., a smartphone, tablet, personal computer, smartwatch, smartglasses, etc.), equipped with a transceiver for wirelessly receiving and/or transmitting data from a remote source (e.g., the Internet), location finding electronics (e.g., a GPS receiver) and acoustic output means (e.g., a speaker, headphones, etc.) can wirelessly connect with a remote server and run the mobile tour instruction file on the user's own portable electronic device so that the user can engage in the self-guided audio tour.

Figure 1:
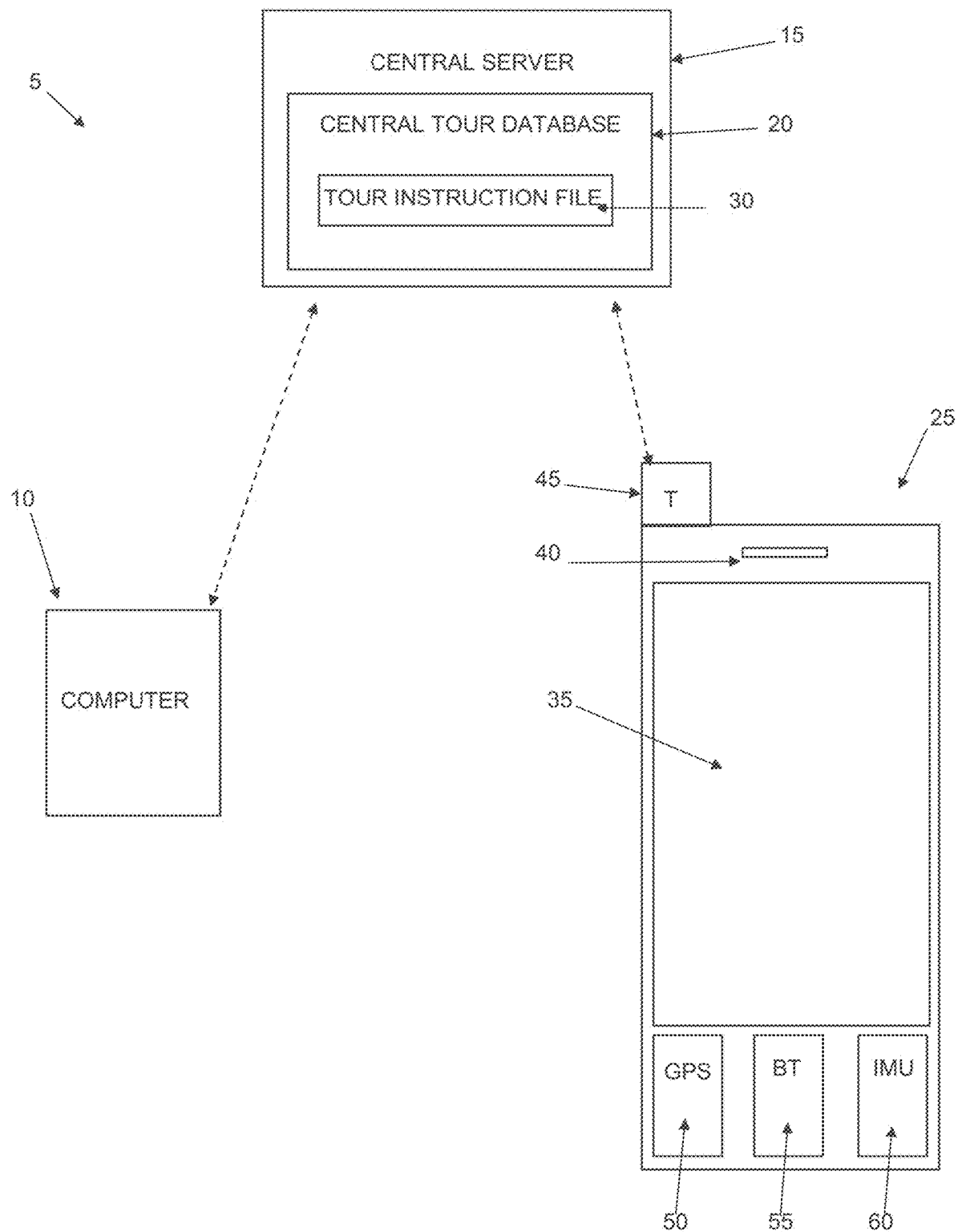
FIG. 1 is a schematic view showing a novel mobile tour delivery system formed in accordance with the present invention.

More particularly, and looking now at FIG. 1, there is shown a novel mobile tour delivery system 5. Mobile tour delivery system 5 generally comprises a computer 10, a central server 15 containing a tour database 20, and a personal electronic device 25 (e.g., a smartphone, a tablet, a portable computer, a smartwatch, smartglasses, and headphones, either alone or in combination with one another).

Computer 10 is typically a desktop or mobile computer which may be used to generate a novel tour instruction file 30 that is stored on central server 15 in tour database 20. Tour instruction file 30 comprises a digital file defining the parameters of a particular self-guided audio tour, and includes all audio/text/video files required for the tour. In one preferred form of the invention, computer 10 utilizes software (e.g., software running on central server 15 and provided to computer 10 via a web-based interface) to generate the novel tour instruction file 30 and to store the novel tour instruction file 30 in tour database 20 on central server 15, as will hereinafter be discussed in further detail.

Personal electronic device 25 is typically an end user's smartphone, but may be any electronic device (e.g., a tablet, personal computer, smartwatch, smartglasses, etc.) configured to receive digital information and present that information to a user, as will be appreciated by one of ordinary skill in the art in view of the present disclosure. Personal electronic device 25 preferably comprises a display 35, an acoustic output means (e.g., a speaker) 40, and a wireless transceiver 45 (e.g., a cellular and/or wireless network adapter) for receiving digital data from central server 15 and/or for transmitting data to central server 15. Personal electronic device 25 preferably also comprises a GPS receiver 50, a Bluetooth transceiver 55 for wirelessly receiving and/or transmitting signals via Bluetooth and an inertial measurement unit (IMU) 60 for sensing the position and disposition of personal electronic device 25 relative to Earth gravity.

In use, computer 10 is used by a tour creator (e.g., a third-party) to generate a tour instruction file 30 which is stored in tour database 20 on central server 15. Tour instruction file 30 comprises all of the parameters of a tour, including locations of particular locations/exhibits, the order in which locations/exhibits are to be visited by the end user, the particular audio files to be played when the end user is proximate an location/exhibit or en route to an location/exhibit, etc.

When an end user desires to undertake a particular self-guided audio tour, the end user's personal electronic device 25 connects to central server 15 (e.g., via the Internet) using wireless transceiver 45, and the end user accesses the desired tour instruction file 30 (e.g., by navigating through a web-based interface using display 35 or other means).

Once the appropriate tour instruction file 30 has been identified, personal electronic device 25 downloads (or digitally streams) the appropriate elements of the particular tour, identifying a particular starting point for the self-guided audio tour (e.g., via GPS, Bluetooth beacon, etc.), and directs the end user to the starting point (e.g., the first location/exhibit on the tour) for the self-guided audio tour. The self-guided audio tour then commences, with central server 15 delivering appropriate audio (and/or text and/or video) to personal electronic device 25, presenting the audio to the user via acoustic output means 40 (and presenting any text and/or video to the user via display 35).

During the self-guided audio tour, display 35 can function as an input/output device to provide selections to the end user (such as prompts to start or stop the tour, select an option during the tour, etc.), and the end user can use display 35 as an input device to make selections (such as by touching a button on display 35, or by selecting from a menu on display 35, etc.). Furthermore, during the self-guided audio tour, and as will hereinafter be discussed in further detail, other elements of personal electronic device 25 (e.g., a microphone on the smartphone, or headphones) can function as an input/output device to provide selections to the end user (such as by providing options to the end user in the form of an audio prompt), and the end user can use other elements of the personal electronic device 25 as an input device to make selections (e.g., by using the microphone on a smartphone to provide voice input, or by tapping on the housing of an IMU-equipped smartphone so as to indicate a selection via the tapping, or by tapping on an earpiece of IMU-equipped headphones to indicate a selection via the tapping, etc.).

When the audio (and/or text and/or video) for the first location/exhibit on the self-guided audio tour has been delivered to the end user, the end user is directed to move to the next exhibit on the tour via personal electronic device 25 (e.g., via an audio prompt and/or directions), as will hereinafter be discussed in further detail.

It will be appreciated that, where tour instruction file 30 identifies the location of a particular location/exhibit by GPS coordinates, GPS receiver 50 of personal electronic device 25 may be used to guide the user to the particular location/exhibit (and from that particular location/exhibit to the next exhibit/location on the tour, etc.), as will hereinafter be discussed in further detail.

Alternatively and/or additionally, where tour instruction file 30 identifies the location of a particular exhibit/location by Bluetooth beacon, personal electronic device 25 may direct a user from one exhibit/location (i.e., a first Bluetooth beacon) to another exhibit/location (i.e., a second Bluetooth beacon), as will hereinafter be discussed in further detail.

It will be appreciated that where personal electronic device 25 comprises inertial measurement unit (IMU) 60, the end user may be directed (e.g., via audio prompt from acoustic output means 40) to face a particular direction during the tour (e.g., "turn left") and/or the audio delivered to the end user may be augmented to reflect the user's position relative to a particular exhibit (e.g., augmented so that the audio sounds as if it is delivered from the exhibit, etc.), as will hereinafter be discussed in further detail.

2. Advanced Data Trigger Mobile Tour Delivery System—GPS 2.1 Background

If an End User is in a new city and desires to undertake a self-guided audio tour, the End User typically has the option of an application-based tour that can be played on the End User's smartphone or other mobile device (e.g., a tablet). The smartphone/other mobile device is typically connected to a network (e.g., via a cellular signal) and typically comprises a GPS chip for location tracking.

The End User can download an application to their smartphone that can be used to guide the End User to specific locations on the self-guided tour (e.g., historical sites).

Each location on the self-guided tour has a GPS coordinate (e.g., Granary Burial Ground in Boston, Mass. is at Latitude: 42.3574, Longitude: −71.0618).

With such an app, when the smartphone/other mobile device of the End User acquires the GPS coordinate of the End User, an audio file is played on the End User's smartphone/other mobile device via the application on their smartphone/other mobile device.

The application on the smartphone/other mobile device could identify multiple locations (each of which location has its own GPS coordinates) for the End User to follow in a group. This grouping then makes them a themed grouping, or a tour.

Figure 2:
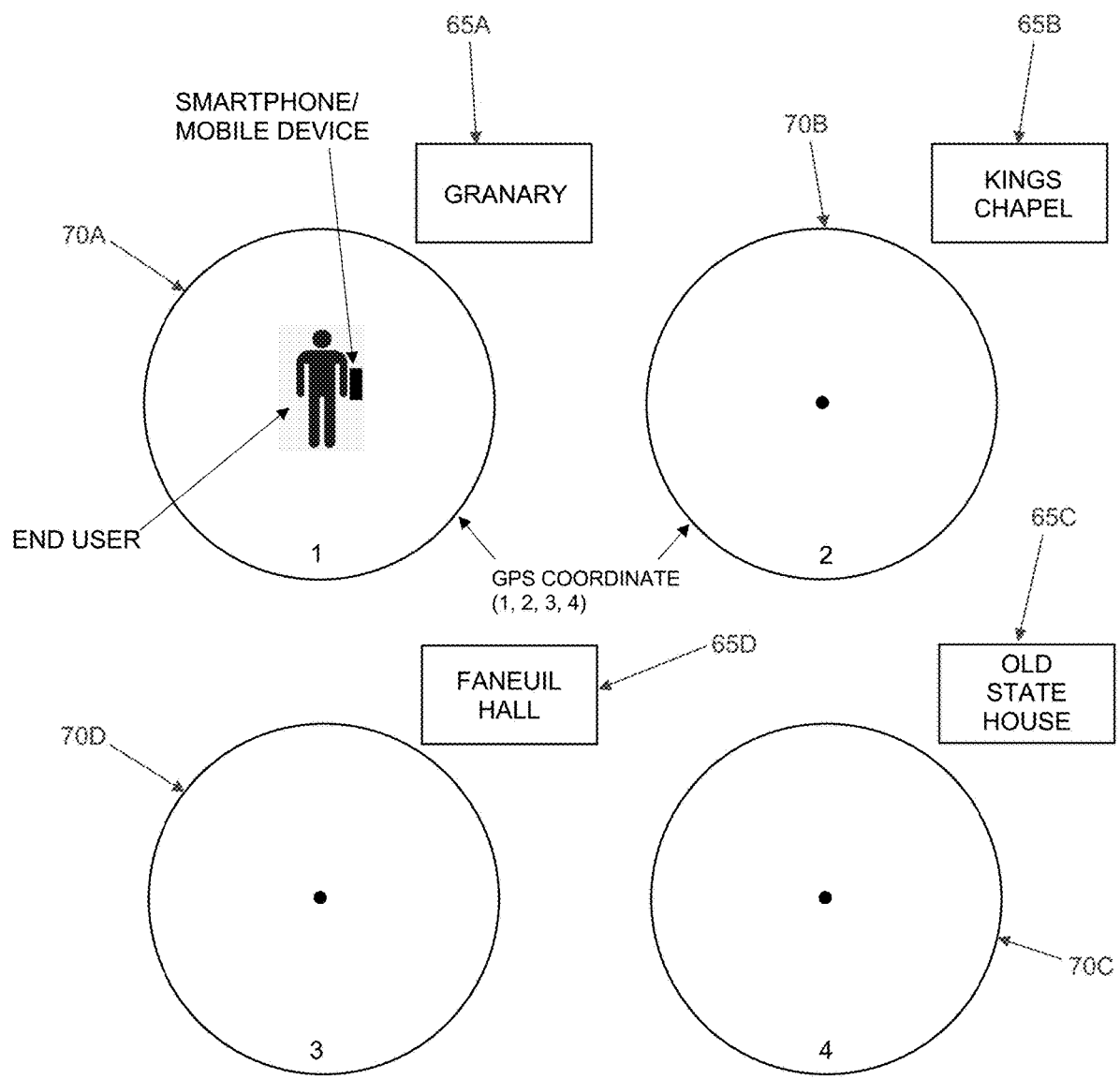
FIGS. 2 and 3 are a schematic views showing the relationship between an End User, a plurality of locations/exhibits, and GPS coordinates for the plurality of locations/exhibits (note that in FIG. 2, the GPS coordinate system correctly detects the location of the End User, whereas in FIG. 3, the GPS coordinate system incorrectly detects the location of the End User)

FIG. 2 is a schematic view showing four exemplary historical sites 65A, 65B, 65C, 65D, each of which is identified by their respective GPS coordinates 70A, 70B, 70C, 70D (which may identify a location area centered around particular GPS coordinates). In FIG. 2, the End User is at the first GPS coordinate 70A. When the End user moves to each of the other GPS coordinates (i.e., to each of the other historical sites 65B, 65C, 65D), an audio file is played (e.g., an audio file that provides the user with information about each particular historical site).

2.2 Challenges Faced by Current Tour Applications 2.2.1 GPS is not always Accurate GPS accuracy can change based on many variables, including but not limited to: proximity to metal objects, surrounding buildings, the nature of the GPS chip, weather conditions, atmospheric conditions, people in the vicinity of the End user, signal strength, etc.

2.2.2 Two GPS Coordinates cannot be Placed in Close Proximity

When the two or more GPS coordinates are in close proximity to one another, current self-guided tour systems unpredictably play audio files due to the lack of accuracy of the GPS systems and a lack of control by the application on the End User's smartphone/other mobile device.

These two challenges (i.e., lack of accuracy and confusion caused by close proximity of two or more GPS coordinates) cause the most common error scenario when the application on the End User's smartphone/other mobile device detects a different GPS coordinate than the actual location that the End User is standing at, and plays the audio file associated with the GPS coordinate that the application has erroneously detected. This is due to lack of control on the part of the application and a lack of accuracy on the part of the GPS system and GPS chip.

Figure 3:
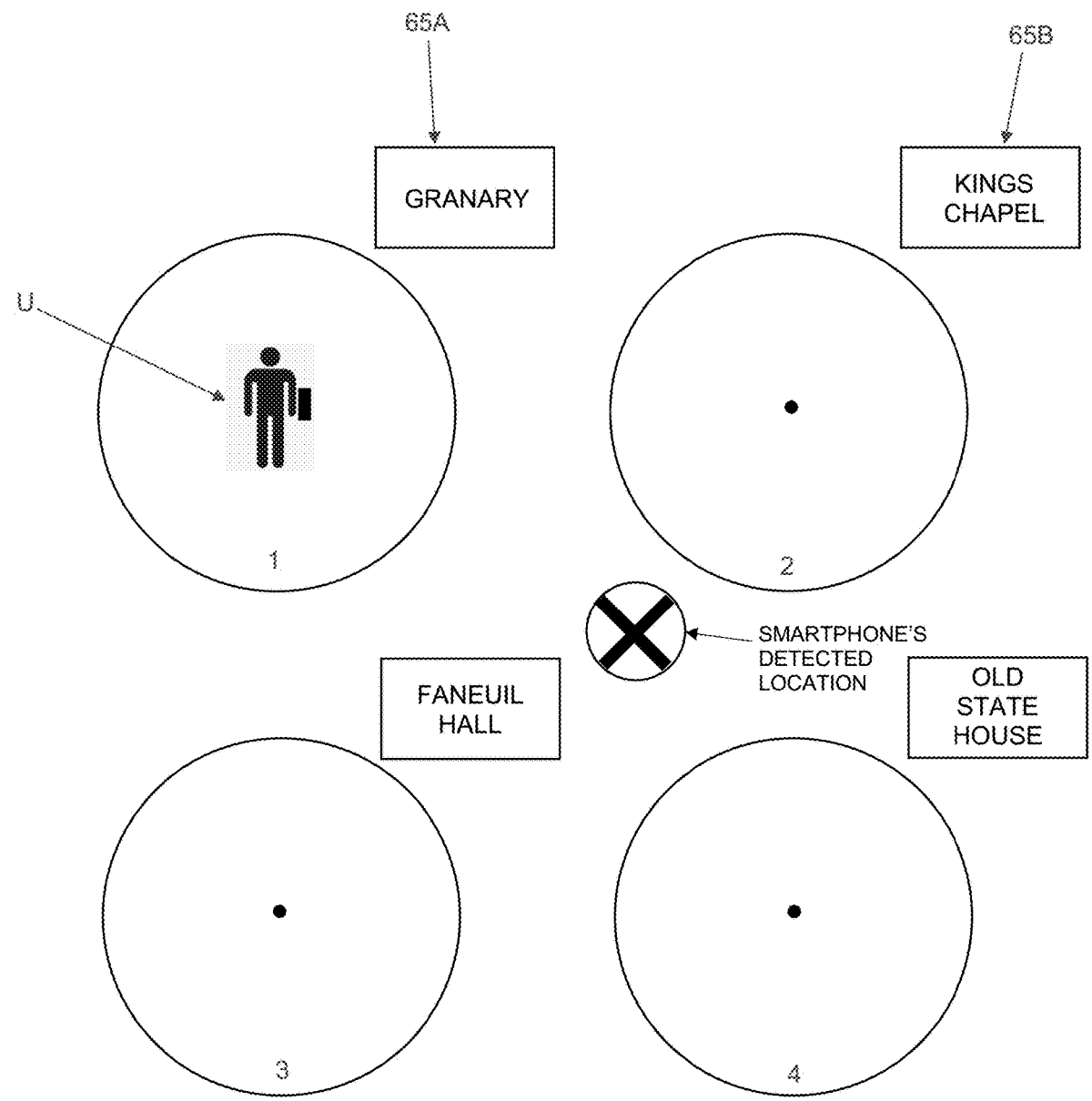

For example, FIG. 3 shows the End User U standing at a first historical site 65A (i.e., the Granary), however, the End User's smartphone's/other mobile device's GPS erroneously detects the End User as being located closer to a second historical site 65B (i.e., King's Chapel), because End User U is located closer to the GPS coordinates for historical site 65B. In this case, the audio file for location 65B (i.e., King's Chapel is played) for the End User even though End User U is actually located at location 65A (i.e., the Granary). End User U located at the Granary is left very confused by the audio that is played, as the incorrect audio is played relative to the location that the End User is actually visiting.

2.3 Further Challenges 2.3.1 The End User's Walking Speed is Unpredictable

Since current self-guided tour systems merely identifies the End User's location based on GPS coordinates, the self-guided tour system recognizes only the absolute position of the End User, and does not track movement of the End User. Thus, such self-guided tour systems do not take into account how quickly the End User is walking between historical sites 65 (or between exhibits or other locations on the tour). An unknown walking speed creates a challenge for presenting navigation instructions to the End User to facilitate location of the next historical site 65 (or other exhibit/location) on the tour. And if the End User does not hear the navigation instructions, the End User can get lost.

Similarly, where the system only engages the End User when the End User has entered into an area defined by a GPS coordinate 70A, 70B, etc. as a tour location, the End User often experiences long periods of silence, which can create confusion for the End User as to what they should do next (or where the End User should go).

And, where a particular audio file is associated with particular GPS coordinates 70A, the audio file may play before it is intended to (e.g., the moment the End User enters the area defined by the GPS coordinates 70A, which may be at a distance from, or out of view of, the historical site 65A or exhibit to which the audio file pertains), making it very confusing for the End User (since there is no correlation between what they are hearing and what they are looking at).

2.3.2 Current Tour Systems do not know the Orientation of the End User

Since current self-guided tour systems do not identify the orientation of the End User, it is challenging to present audio to the End User because the tour system does not know which direction the End User is facing.

If the orientation of the End User were known, a superior interactive experience could be provided and data (audio/video) could be presented at a more effective time.

2.3.3 With Current Tour Systems, the End User must Listen to Complete Audio Files Until they Conclude Since current self-guided tour systems do not dynamically track movement of the End User during a self-guided tour, once the audio file for a particular location/exhibit 65A starts to play, the audio file for that particular location/exhibit plays until its end, unless the user moves to another, different GPS coordinate.

Thus, the approach of existing self-guided audio tour systems removes "choice" from the End User and degrades the End User's experience.

And it should also be appreciated that not all points on a tour are of interest to every End User, so one End User may want to listen to less audio and explanation concerning a particular historical site 65 (or exhibit) than other End Users.

2.3.4 The End User must Listen to every GPS Audio Location File

Current self-guided tour systems generally play audio for the End User automatically. That is, when the End User enters the area defined by GPS coordinates 70A, 70B, etc., current self-guided tour systems automatically play the audio for the location/exhibit 65A, 65B associated with those particular GPS coordinates. Hence, with existing systems, the End User must be presented with each audio file during a self-guided audio tour.

Stated another way, with current self-guided audio tour systems, there is no option for the End User to "opt in" as a choice to listen to a particular audio file associated with a particular historical site 65 (or exhibit).

2.3.5 Lack of IMU on Listening Device

Current systems do not provide an option to use listening devices (e.g., headphones) comprising an IMU for inputting an End User selection during operation of the self-guided audio tour.

With current systems, an End User now must take their smartphone out of their pocket in order to interact with the tour (e.g., to make a selection such as to start or stop the tour, select an option during the tour, etc.).

The present invention allows for the End User to make a selection without removing their smartphone from their pocket. By way of example, but not limitation, in one form of the invention, an IMU is provided on the End User's headphones, and the End User may interact with the tour (e.g., to make a selection such as to start or stop the tour, select an option during the tour, etc.) when the accompanying phone is in the End User's pocket by double tapping the side of the headphones (i.e., for detection of the taps by the IMU).

2.4 How GPS Coordinate Tours are Currently Created and Delivered

Figure 4:
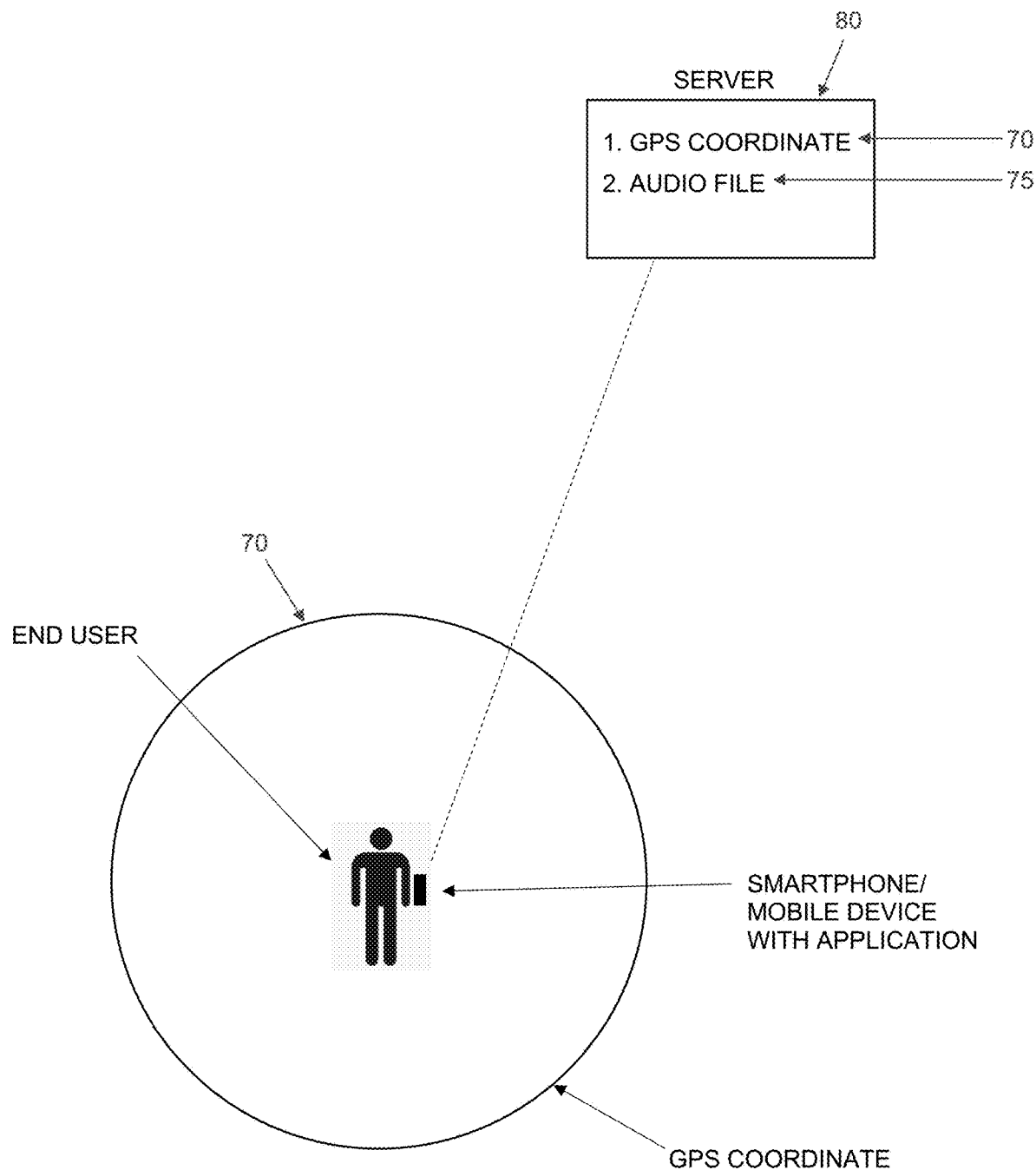
FIGS. 4-6 are schematic views showing further aspects of a novel mobile tour delivery system formed in accordance with the present invention.

The GPS coordinates 70 (and the size of the area extending about the GPS coordinates) for a particular location/exhibit 65 are typically assigned by a Tour Creator. Looking now at FIG. 4, according to current self-guided tour systems, GPS coordinates 70 are typically assigned according to the following procedure:

1. The Tour Creator chooses a GPS coordinate 70 (e.g., the Granary Burial Ground in Boston is Latitude: 42.3574|Longitude: −71.0618);

2. The Tour Creator then associates an audio file 75 with that GPS coordinate 70;

3. The GPS coordinate 70 and the audio file 75 pair (i.e., the audio file associated with that particular GPS coordinate) are uploaded to a server 80; and 4. When the End User is located at that GPS coordinate 70, the audio file 75 is accessed from the server 80 and played for the End User.

2.5 The Invention: The ADT (Advanced Data Trigger) Mobile Tour Delivery System 2.5.1 Overview The present invention comprises a tour delivery system that provides the Tour Creator with a more precise and controlled method to create and deliver the tour experience for the End User.

More particularly, the present invention provides the Tour Creator with a more precise and controlled method to create and deliver the tour experience for the End User by creating a Tour Type and adding Advanced Data Trigger (ADT) locations that are associated with each the particular GPS coordinates of each location/exhibit on the tour. The ADT is programmed with multiple control options (see below), and is also combined with the application controls built into the application running on the End User's personal electronic device 25 (e.g., a smartphone).

Through this process, the present invention allows the Tour Creator to produce a more controllable, precise and interactive experience with the data/media/audio delivery method, which also detects and utilizes the orientation of the End User.

This not only solves the issues discussed in the "challenges" sections above, but it also further creates a more interactive experience for the End User.

2.5.2 The End User Uses their Own Personal Electronic Device for Engaging in a Self-Guided Audio Tour As noted above, the present invention comprises a mobile tour delivery system 5 that utilizes a personal electronic device 25 (e.g., a smartphone) that typically belongs to the End User. Specifically, with the present invention, every End User has a personal electronic device 25 (e.g., a smartphone/other mobile device) that has some sort of communication chip(s) (e.g., the aforementioned wireless transceiver 45, the aforementioned, the aforementioned GPS receiver 50, the aforementioned Bluetooth transceiver 55, etc.) that allows the personal electronic device 25 (e.g. a smartphone/other mobile device) to access a remote server (e.g., central server 15) hosting tour data (e.g., the aforementioned central tour database and/or tour instruction file 30).

As noted above, personal electronic device 25 (e.g., a smartphone/other mobile device) also preferably includes a 9 Axis IMU sensor (e.g., the aforementioned IMU 60) to permit personal electronic device 25 to accurately calculate the End User's orientation. Note that the 9 Axis IMU sensor may be provided via a device in addition to a smartphone or tablet, e.g., as an IMU built into headphones or some other device carried by the End User (not shown). Note that for the purposes of the present invention, the term "personal electronic device" is intended to mean a smartphone and/or tablet and/or other mobile device (e.g., headphones, with or without a 9 axis IMU sensor), operating individually or collectively, so as to provide the capabilities utilized by the present invention.

Figure 5:
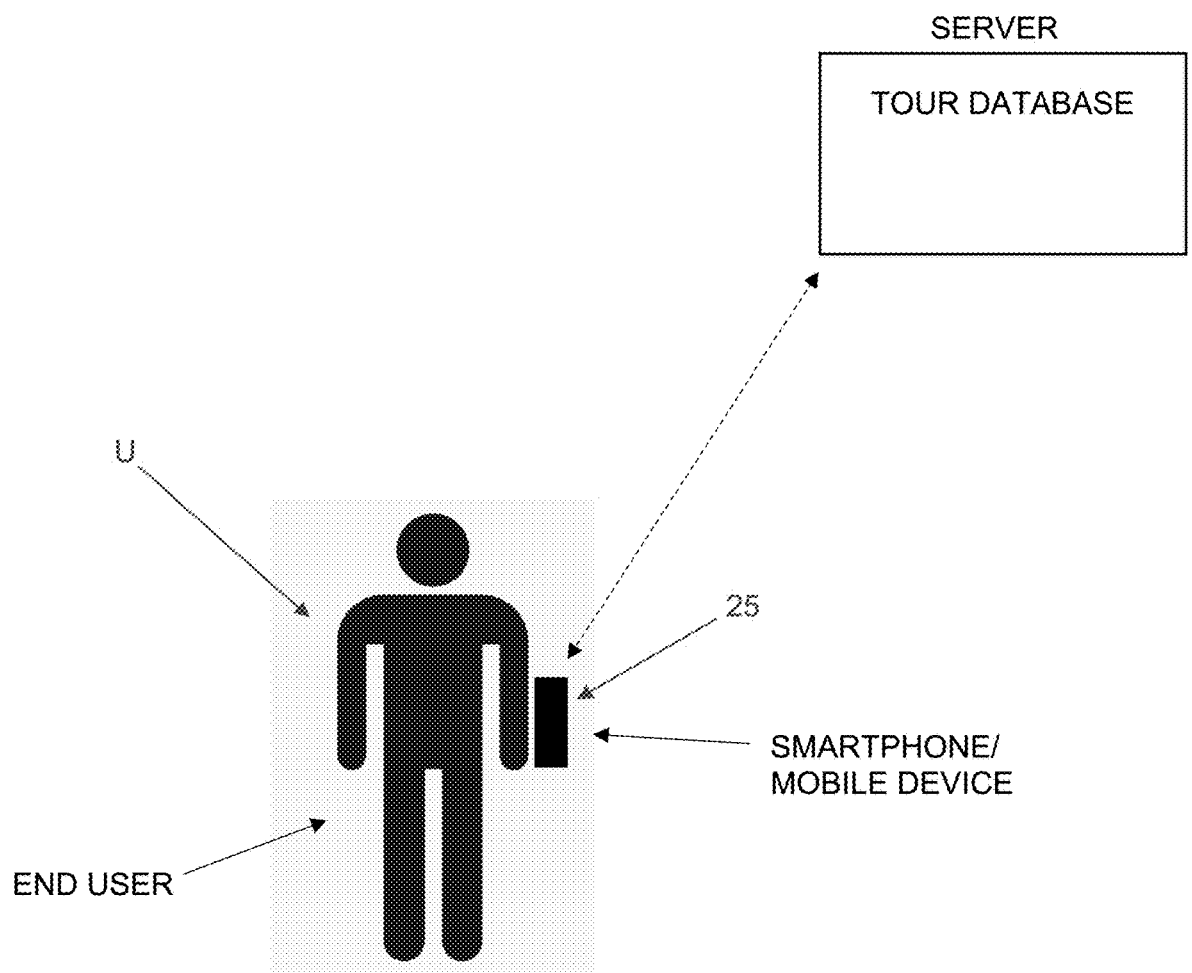

FIG. 5 is a schematic view showing an End User U with a personal electronic device 25 (e.g., a smartphone/other mobile device) that is able to connect to a remote server (e.g., central server 15).

Figure 6:
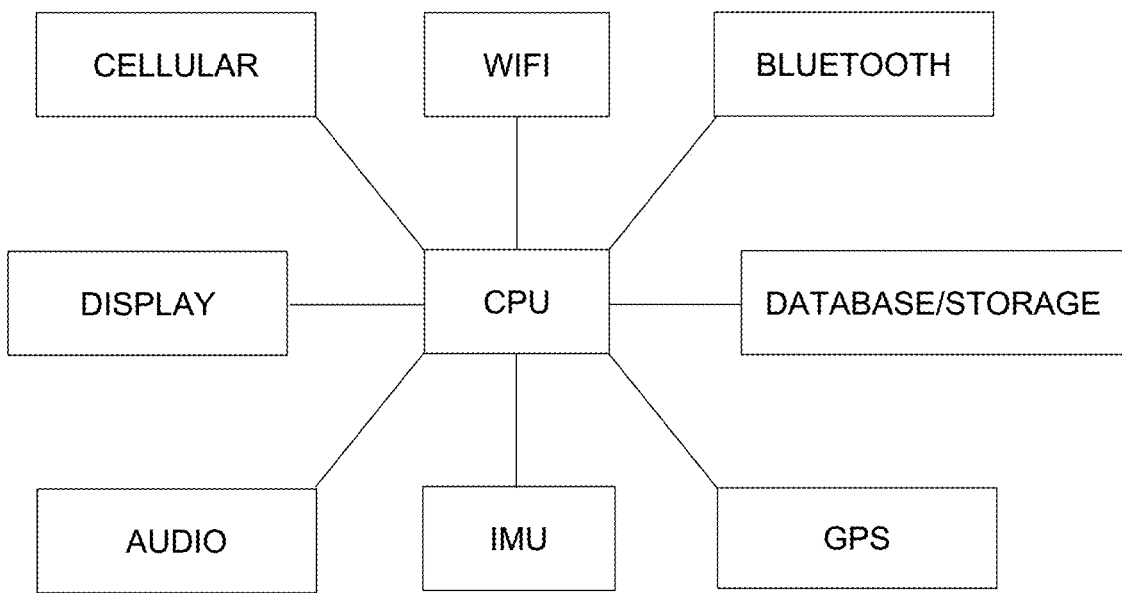

FIG. 6 is a schematic view showing the smartphone/other mobile device functionalities that are preferably provided to personal electronic device 25 according to the present invention. The smartphone/other mobile device can detect GPS, detect IMU, retrieve relevant files from a database (onboard or on the server) and can play audio and/or visual files to the End User.

2.6 Tour Creation for the ADT Mobile Tour Delivery System

2.6.1 Step 1: Choose the Overall Tour Type

The first step in designing a novel self-guided tour according to the present invention is for the Tour Creator to select the type of tour that is to be created. Listed below are exemplary novel tour options that the Tour Creator is able to select from. The Tour Creator is able to choose multiple options to be combined into one tour.

2.6.1.1 Standard Path GPS Tour

A "standard path" type of tour is a standard tour that starts at a point A and ends at a point B, with X number of stops disposed between A and B. When designing a novel self-guided tour according to the present invention, the Tour Creator can select a standard path as the type of tour that is to be created.

Figure 7:
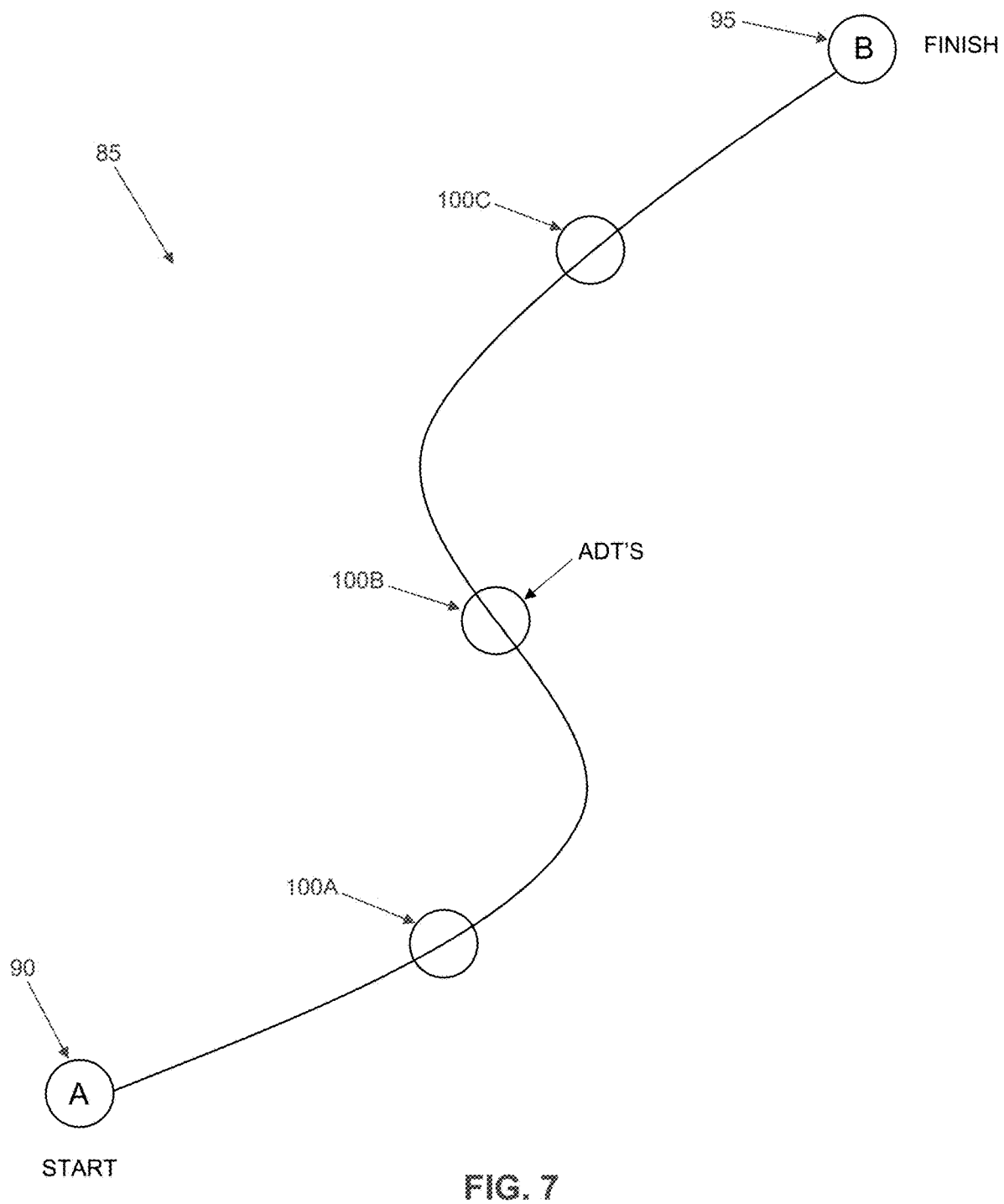
FIG. 7 is a schematic view showing a standard tour path formed in accordance with the present invention.

More particularly, and looking now at FIG. 7, there is shown a standard path 85 that has a start point A (indicated at 90) and an end point B (indicated at 95), with locations/exhibits 100A, 100B, 100C disposed between start point 90 and end point 95 (note that the Tour Creator may designate as many "stops", i.e., location/exhibits defined by particular GPS coordinates, as the Tour Creator desires to include on the tour in between start point 90 and end point 95).

2.6.1.2 Loop

When designing a novel self-guided tour according to the present invention, the Tour Creator can select a loop as the type of tour that is to be created. A "loop" type tour is a loop tour, e.g., for running, which allows for an additional data trigger that only plays once, i.e., the "Introduction Data" point.

Figure 8:
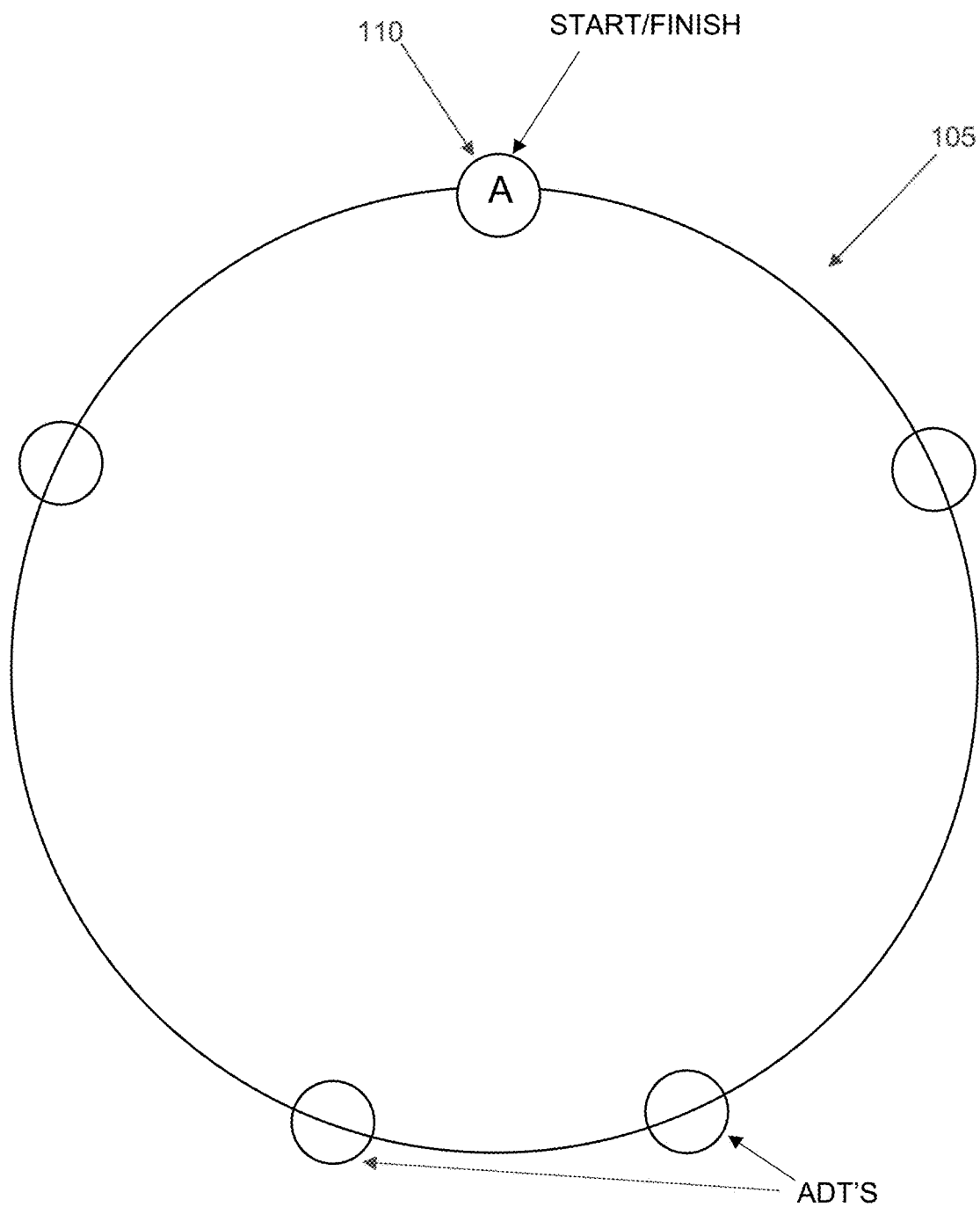
FIG. 8 is a schematic view showing a loop tour path formed in accordance with the present invention.

More particularly, and looking now at FIG. 8, the Loop tour option allows the Tour Creator to create a loop tour path 105 having the same Start point and Finish point 110. Loop tour path 105 is unique in that it plays an Introduction audio file (i.e., a first audio file) to the End User at the first ADT (e.g., Start point/Finish point 110), however, when the loop is repeated (e.g., when the user completes the loop tour path 105 and arrives back at Start point/Finish point 110), loop tour path 105 plays a second (e.g., different) loop introduction file (i.e., a second audio file) at the originating GPS coordinate (e.g., at Start point/Finish point 110). The first and second audio files are different so that the End User does not have to listen to the introduction of how the tour works (i.e., the first audio file) again, making the loop tour a smoother experience. By way of example but not limitation, consider the example in which the End User is running loops around the Boston Common. The first "loop" around Boston Common would play a first audio file to introduce the Running Tour, and the first audio file could be a minute or two in duration. During the second (or third, fourth, etc.) loop around Boston Common, the End User generally does not want to hear the same introduction repeated, so it is replaced with the second audio file (or a third audio file, a fourth audio file, etc.).

This feature can be included in other tour types if desired.

2.6.1.3. "Dig Deeper"

The "Dig Deeper" option is an option that allows the Tour Creator to create optional extensions off of a main tour path for the End User to take at their own election. The "Dig Deeper" option is preferably presented as optional, such that if the End User is interested in the extension, the End User has to "opt in" by selecting the "Dig Deeper" extension on their personal electronic device 25 (e.g., a smartphone/other mobile device).

Figure 9:
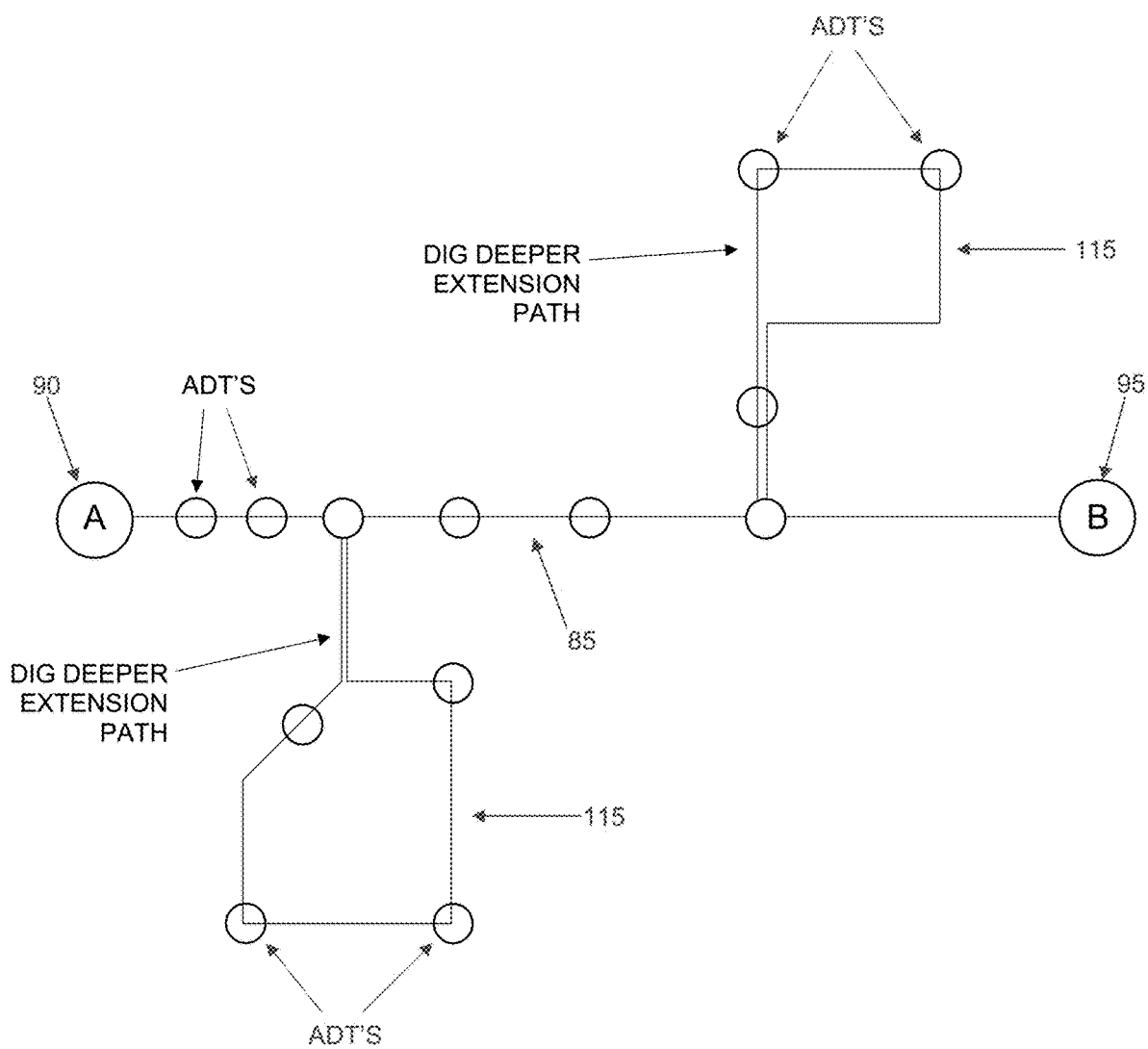
FIG. 9 is a schematic view showing a standard tour path comprising Dig Deeper extension paths formed in accordance with the present invention.

By way of example but not limitation, and looking now at FIG. 9, consider the Freedom Trail in Boston, Mass. If the End User is engaged in a self-guided audio tour using the novel system of the present invention, and if the End User is walking the Freedom Trail along a given standard path 85, and if the Tour Creator had provided the Granary Burial Ground as a "Dig Deeper" extension located between a starting point A and an ending point B, the End User could "opt in" to following the "Dig Deeper" extension to the Granary Burial Ground by selecting the "Dig Deeper" extension on the End User's personal electronic device 25 (e.g., a smartphone/other mobile device) if the End User is interested and wishes to spend approximately 10 minutes learning about Paul Revere and Sam Adams at the Granary Burial Ground. Alternatively, the End User could elect to not opt in, and instead could continue on the standard path 85 to the next location (ADT) 100 along the standard path 85.

FIG. 9 shows two exemplary "Dig Deeper" Extensions 115 that allow the End User to optionally take an extended route off of a standard path 85. In FIG. 9, two different "dig deeper" optional extensions 115 are shown. According to the standard path 85 shown in FIG. 9, the End User could elect to begin walking from start point A (indicated at 90), could elect to take either (or both) of the "Dig Deeper" extensions 115 disposed between start point A and finish point B (indicated at 95), or, alternatively, the End User could walk from the start point A and end at the finish point B without taking either of the "Dig Deeper" Extensions 115.

This feature can be included in other tour types if desired.

2.6.1.4 9 Axis IMU Sensor

The Tour Creator can also take advantage of additional options when designing a tour if the user's personal electronic device 25 comprises an IMU 60 (e.g., a 9 Axis IMU sensor).

The provision of an IMU 60 allows the Tour Creator to enable more features that rely on knowing the End User's orientation and which direction the End User is facing vis-à-vis a particular location/exhibit or the tour path.

By way of example but not limitation, the Tour Creator can use orientation information derived from IMU 60 to present data (e.g., an audio file, text, etc.) to the End User only when the End User is facing a point of interest (i.e., when the End User's orientation is in a specific direction). In other words, when the End User's personal electronic device 25 (e.g., a smartphone/other mobile device/headphones/smart glasses, etc) comprises an IMU 60 (e.g., a 9 Axis IMU sensor), the personal electronic device accesses the GPS location data, and the user orientation data, and then plays the audio file associated with that particular GPS location and user orientation data.

It should also be appreciated that, if desired, IMU 60 can be used for interacting with the tour (e.g., for making a selection). By way of example but not limitation, IMU 60 may be built into the End User's headset (e.g., headphones, smart glasses, etc.) and the End User may make a selection using the headset, with the End User's smartphone remaining in their pocket. To make a selection, the End User, upon hearing a notification, touches (e.g., taps, touches, swipes, etc) the side of their headphones, smart glasses, etc. for detection by IMU 60, whereby to make a selection. The selection detected by IMU 60 could be for multiple purposes. By way if example but not limitation, the selection could be to opt in to a story on the tour, or the selection could be to register a position the user is facing, or the selection could be to choose a file to play, or the selection could be to pause the audio, or the selection could be to skip the audio, etc. Note that multiple selections are possible through IMU detection, e.g., a single tap may have one meaning, a double tap may have a second meaning, etc.

This feature can be included in other tour types if desired.

2.6.1.5 Reverse Tour

The "Reverse Tour" feature is a feature that allows for the tour path starting and ending points to be interchangeable.

The "Reverse Tour" feature thus allows for each location/exhibit (ADT) disposed along a tour path to be accessed by the End User when the End User follows the tour path beginning from either end of the tour path. And it will be appreciated that the "Reverse Tour" feature allows the order of the stops disposed along the tour path to be switched. By way of example but not limitation, the order of the stops (i.e., locations/exhibits/ADTs) along the tour path could be an order of 1, 2, 3, 4, 5 (where each number identifies a particular location/exhibit/ADT). Or it could be in order of 5, 4, 3, 2, 1.

Figure 10:
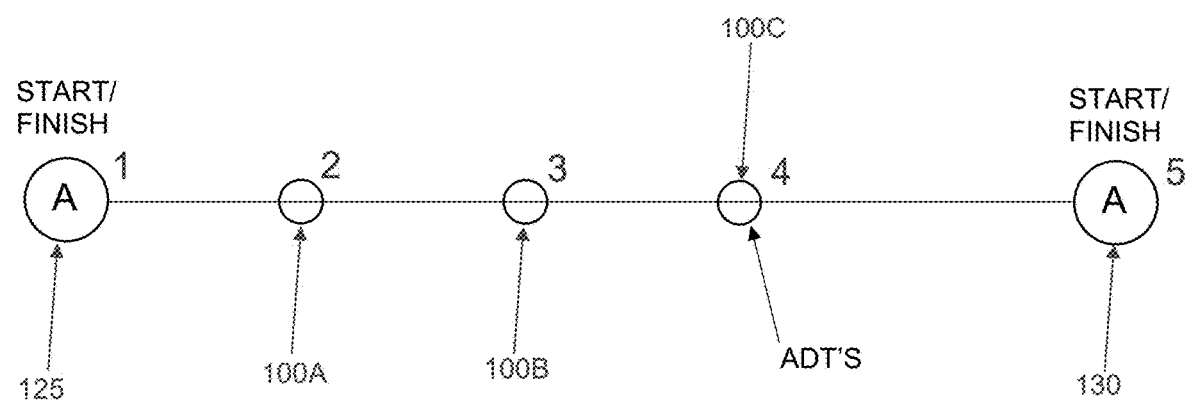
FIG. 10 is a schematic view showing a standard tour path comprising various stops/locations/exhibits formed in accordance with the present invention.

FIG. 10 shows an exemplary Reverse Tour path 120. An End User may begin Reverse Tour path 120 at either start point/finish point A (indicated at 125) or at start point/finish point A (indicated at 130) at the End User's option. If the End User starts at 125, the End User proceeds first to stop 100A, then from stop 100A to stop 100B, then from stop 100B to stop 100C, then to end point 130. If the End User instead starts at 130, the End User proceeds first to stop 100C, then from stop 100C to stop 100B, then from stop 100B to stop 100A, then to end point 125.

This feature can be included in other tour types if desired.

2.6.1.6 Tour by Numbers

If desired, the Tour Creator can select the option to create a tour that is guided by numbers. With this form of the invention, the tour path, and stops along the tour path, are determined based on the numbers entered into the End User's personal electronic device (e.g., in the manner of a traditional museum audio tour). To design a tour guided by numbers, the Tour Creator associates a number value with each location (and links associated audio and/or other data with that location). When the End User enters that number value, the associated audio (and other associated data, e.g., images) is delivered to the End User.

2.6.1.7 Explorer Tour

It should also be appreciated that, if desired, the Tour Creator could select a tour type that omits the tour path and instead allows the Tour Creator to create a tour that does not have a tour path. By way of example but not limitation, this feature is advantageous for tours that consist of walking around a park, or telling short stories at multiple locations.

2.6.1.7 Bluetooth Tour

The Tour creator could choose an option for a Bluetooth tour, as will hereinafter be discussed in further detail.

This feature can also be included in GPS tours, to have them play in one tour.

2.6.2 Step 2: Layout ADT GPS Coordinates and Order Numbers

Once the Tour Creator has selected the type of tour that is to be created (e.g., standard tour path, loop tour path, reverse tour path, etc.) the Tour creator assigns the overall path of the tour between the starting point A (indicated at 90) and the end point B (indicated at 95).

Figure 11:
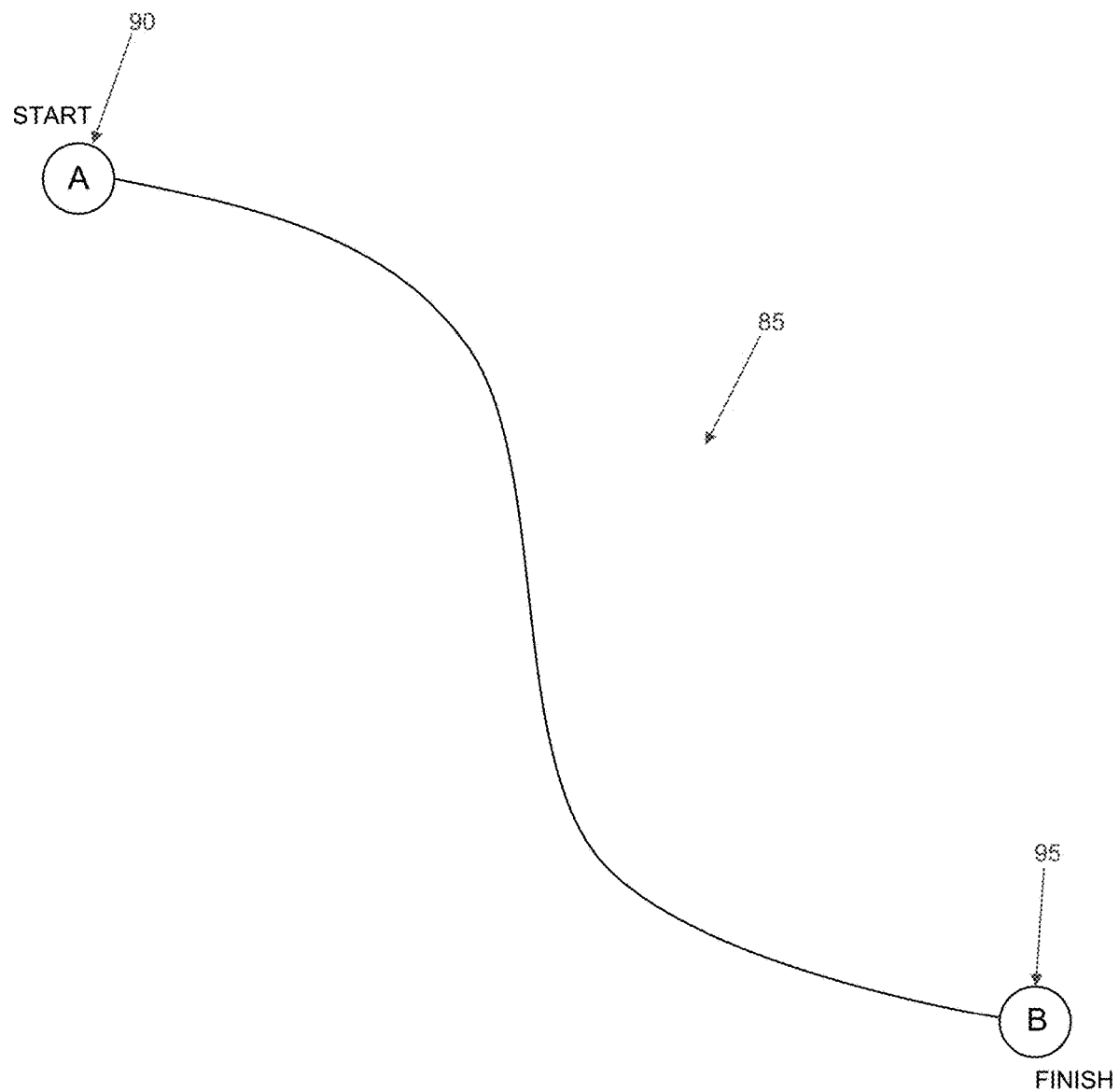
FIG. 11 is a schematic view showing a standard tour path formed in accordance with the present invention.

FIG. 11 shows a standard path 85 with start point A (indicated at 90) and end point B (indicated at 95) chosen by the Tour Creator.

Figure 12:
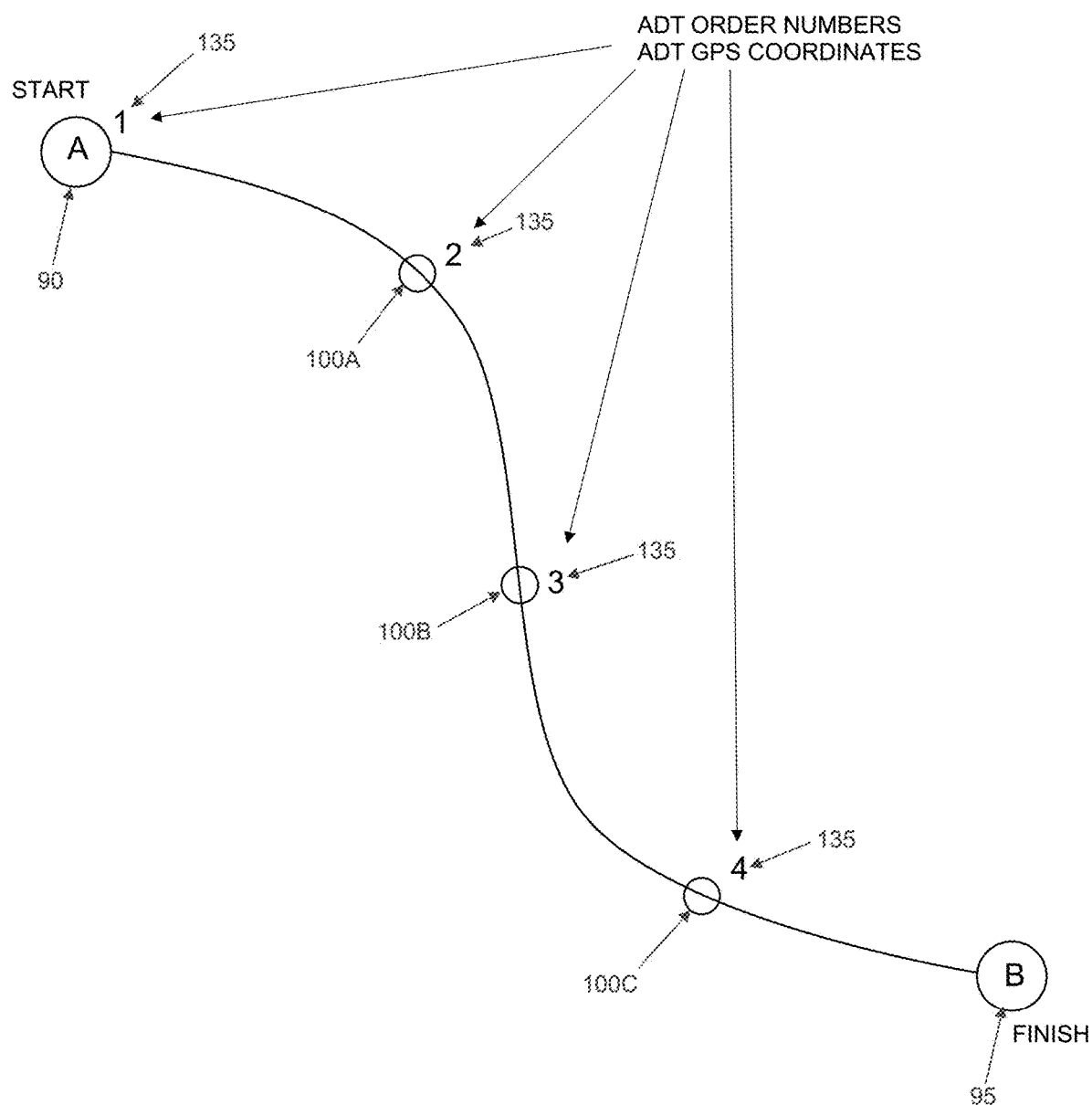
FIGS. 12 and 13 are a schematic views showing a standard tour path formed in accordance with the present invention, wherein the standard tour path comprises a plurality of stops/locations/exhibits disposed along the tour path, and associated GPS coordinates and order numbers for the plurality of stops/locations/exhibits disposed on the tour path.

Looking now at FIG. 12, after the Tour Creator has selected the type of tour and assigned the overall path of the tour, the Tour Creator assigns GPS coordinates (or Bluetooth beacon locations or location-associated numbers if applicable to the tour type) to each location/exhibit/ADT 100 along the tour path 85 and also assigns an Order Number 135 to each stop 100 (i.e., to each ADT). The Order Number 135 indicates the order in which the location/exhibit/ADT 100 will be presented to the End User during the process of the tour. During the tour, the data associated with the locations will be delivered in the sequence identified by Order Number 135. For example, arrival at stop 1 will deliver the data associated with stop 1, then arrival at stop 2 will deliver the data associated with stop 2, then arrival at stop 3 will deliver the data associated with stop 3. If the GPS then detects arrival at stop 5 without having already detected arrival at stop 4, it will not play the data associated with stop 5. It will search and then only deliver the data associated with stop 4 when it is detected that the End User has arrived at stop 4. After the data associated with stop 4 is delivered, then it will continue in sequential order, stop 5, stop 6, and so on.

At this stage, if the Tour Creator chooses the "Dig Deeper" option, the Tour Creator can assign a "Dig Deeper" extension 115 (i.e., a "Dig Deeper" ADT location) at any point along the tour path 85, and the Tour Creator may also assign the start point of each "Dig Deeper" extension 115 (not shown in FIG. 12).

FIG. 12 shows a standard path 85 tour with 4 stops 100 (i.e., 4 ADT locations) along standard path 85. Each stop 100 (i.e., each ADT) is assigned GPS coordinates corresponding to the location of that particular stop 100, and an Order Number 135 corresponding to the location of that particular stop 100 along standard path 85 relative to other stops 100.

2.6.3. Step 3: The Tour Creator Chooses the Data Delivery Style

After the Tour Creator has selected the type of tour path (e.g., standard tour path, loop tour path, reverse tour path, etc.) and has assigned a starting point 90, an ending point 95 and any locations/exhibits/ADTs 100 between starting point 90 and ending point 95 (as well as the appropriate GPS coordinates and Order Number 135 for each point on the path), the Tour Creator selects, for each stop 100 (i.e., each ADT), how the Tour Creator would like to present data/media/audio/video to the End User. This gives the Tour Creator more control over the presentation style and results in a smoother and more interactive experience for the End User. Exemplary choices of audio style are described below, but not limited to:

2.6.3.1 Play Until End

The Tour Creator selects the "play until end" option if the Tour Creator wants the data/media/audio/video associated with the tour to play until the End User has completed the tour path.

The "play until end" selection tells the personal electronic device 25 to not look for the next location/exhibit/ADT 100 (or GPS coordinates for the next location/exhibit/ADT 100) until the current audio/video selection has completed. The data/media/audio/video associated with a particular location/exhibit/ADT 100 of the tour is assigned to continue playing until the system finishes presenting its data (audio/video).

2.6.3.2 Play Until Next Trigger Point

The Tour Creator selects the "play until next trigger point" option if the Tour Creator wants data/media/audio/video associated with the tour to play until the End User is presented with the next data trigger (i.e., the next location/exhibit/ADT on the tour).

The "play until next trigger point" selection tells the personal electronic device 25 to continue looking for the next relevant GPS coordinate for the next location/exhibit/ADT 100 and, when found, to immediately play the data/media/audio/video associated with that particular location/exhibit/ADT 100.

2.6.3.3 Navigational Overlay

The Tour Creator selects the "navigational overlay" option if the Tour Creator wishes to momentarily pause the playing of data/media/audio/video associated with the tour in order to give the End User navigational instructions (e.g., "turn left," "turn right", "continue walking 500 feet", etc.). With the "navigational overlay" option, the currently playing data file (i.e., the data/media/audio/video playing for the End User) is paused, and then the Navigational Overlay plays for a short term (3-5 seconds), and then the currently playing data file resumes.

The "navigational overlay" option gives the Tour Creator control to navigate the End User without the End User missing any of the content of the current audio/video file that is being played for the current location/exhibit/ADT 100.

Thus, the Tour Creator has better controls to navigate the End User without having to interrupt/miss a story-telling process.

2.6.3.4 Focus Point

As noted above, IMU 60 of personal electronic device 25 permits the Tour Creator to customize various aspects of how tour data is presented to the End User during a tour. The "focus point" feature permits a Tour Creator to specify that when the End User faces an object (e.g., a location/exhibit/ADT 100), the audio/video associated with that object (e.g., location/exhibit/ADT 100) is played by personal electronic device 25. When the End User changes their orientation relative to that object (e.g., location/exhibit/ADT 100), for example, by turning to face in a different direction, the audio/video for that object stops playing on personal electronic device 25.

This is achieved by utilizing IMU 60 (e.g., a 9 Axis IMU) of personal electronic device 25, which allows the personal electronic device 25 to know the position/orientation of the End User relative to a particular object (e.g., location/exhibit/ADT 100).

It will be appreciated that the "focus point" feature allows the Tour Creator to specify the playing of audio/video files only when the End User is facing a particular object.

It will also be appreciated that the "focus point" feature also allows the End User to "opt out" of any audio/video files they are not interested in by simply changing their orientation relative to the object (e.g., location/exhibit/ADT 100).

2.6.3.5 Notification Point/Opt In Notification

The "notification point" feature alerts the End User that there is an stop 100 (i.e., an ADT) where they are currently located, and the End User has the option to "opt in" to receiving the data associated with that stop 100 (i.e., the data associated with that ADT), with the user getting the audio/video data by performing an action using their personal electronic device, on their smartphone, headphones, smart glasses, etc., 25, e.g., pressing a button, double-tapping display 35 of personal electronic device 25, etc.

The "notification point" option gives the End User greater control over their experience and give them choice.

This Action could be performed on headphones with an embedded IMU sensor. The IMU sensor would pick up actions such as touch, gestures, tapping, pressing a button or other actions. In this case, the end user would be able to keep their smartphone in their pocket and interact with the tour by only performing an action on their headphones, smartglasses, etc.

By way of example but not limitation, imagine if the End User is standing in front of a painting and then hears a short intro. They hear a notification letting the End User know that they can hear an expanded story about the painting. The End Users phone is in their pocket. They are wearing headphones. If the End User is interested, they can "opt in" to listening to the story by performing the said action, if the End User is not interested, they can do nothing and they will not get the audio/video of the story.

In this case the end user touches their headphones to opt in. With that action, the next data plays, in this case, the expanded story of the painting.

2.6.3.6 Spatial Point

The "spatial point" feature allows the audio that is delivered to the End User during a tour to sound like it is coming from a specific location, for example, from a statue. If the user turns around, the audio sounds as if it is coming from behind the user.

The "spatial point" feature gives depth to the experience of the tour for the End User, and makes the audio feel more like it is coming from a different source.

2.6.3.7 Guide Point

The "guide point" feature gives the End User the feeling of a guide speaking over the End User's shoulder.

In addition, each point would have location-specific data added to it. For each point, the Tour Creator would add location-specific data, by way of example including, but not limited to:

1. Image or video for the location;
2. Dialogue showing the text that is spoken;
3. Choice of translation, so each dialogue is translated in multiple languages; and
4. Choice to have the dialogue text generated machine read audio.

It should be appreciated that, with all these factors, each location is the mentioned ADT (Advanced Data Trigger). As discussed above, this includes the GPS point, the Sequential Order Number (if applicable), the audio style and the additional data that is presented.

2.6.4 Completed Tour is Loaded to Server

Once the Tour Creator has completed the process designing a tour, they will have a complete tour with a starting point 90, an end point 95, a tour path 85, and one or more location/exhibit/ADTs 100A, 100B, etc. built in. An exemplary tour is shown in FIG. 13.

Figure 13:
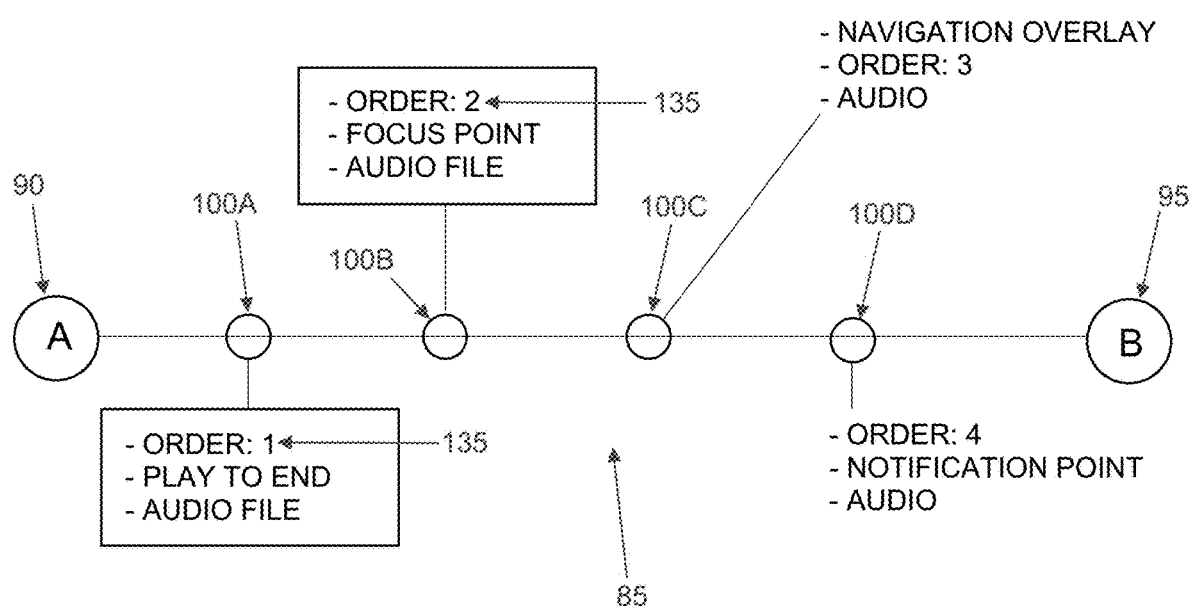

More particularly, FIG. 13 shows a Standard Tour path 85 having a starting point A (indicated at 90), an end point B (indicated at 95) and a tour path extending from A to B with 4 location/exhibit/ADTs 100A, 100B, 100C, 100D disposed along the tour path, each of which location/exhibit/ADT has an order number 135 assigned to it, as well as a particular file and data delivery style attached (i.e., assigned) to it.

Once the Tour Creator has completed designing the tour, the tour can be uploaded to a server (e.g., from the aforementioned computer 10 to central server 15) and made accessible to End Users through the application on the End User's smartphone/other mobile device.

Note that the Tour Creator may alternatively utilize software stored on central server 15 (e.g., a web-based application) to design the tour, in which case the tour is both designed on and stored on central server 15 (without requiring upload from the Tour Creator's computer 10). And the completed tour may be stored in tour database 20 in the form of tour instruction file 30 to facilitate easy searching and locating of the completed tour (e.g., by End Users).

2.7 Exemplary Use

In an exemplary use, the End User runs an application on their personal electronic device 25 (e.g., a smartphone/other mobile device) which downloads or streams a selected tour instruction file 30 for a particular tour and plays an advanced data trigger mobile tour for a particular site (i.e., begins a self-guided audio tour specific for the desired location). By way of example but not limitation, the End User might play a self-guided audio tour for the Freedom Trail in Boston, Mass. As the End User moves about, personal electronic device 25 (e.g., a smartphone/other mobile device) monitors the GPS coordinates of personal electronic device 25 (and hence the location of the End User) and the orientation of the End User, playing the appropriate audio file style and data associated with each particular GPS location and End User orientation.

3. Advanced Data Trigger Mobile Tour Delivery System—Bluetooth Applications 3.1 Overview Bluetooth Beacon tours (i.e., Bluetooth-based tour applications) have their own challenges which can benefit from the novel Mobile Tour Delivery System 5 discussed above.

The present invention comprises a tour delivery system that provides a Tour Creator with a more precise and controlled method to deliver a tour experience to an End User than prior art approaches. As discussed in detail in the section above, the mobile tour delivery system 5 creates Advanced Data Trigger (ADT) location points (i.e., locations/exhibits 100) using GPS coordinates associated with each location/exhibit/ADT. The present invention also enables the mobile tour delivery system 5 to create Advanced Data Trigger (ADT) location points (i.e., location/exhibit/ADTs 100) associated with Bluetooth Beacon Locations rather than (or in addition to) GPS coordinates.

The Advanced Data Trigger (ADT) Mobile Tour Delivery System is programmed with multiple control options (see above) and is also combined with the application controls built into the mobile application running on the End User's smartphone/other mobile device.

Through this process, the invention allows the Tour Creator to produce a more controllable, precise and interactive experience with the data/media/audio delivery method, which detects and utilizes the orientation of the End User.

The following section adds additional subject matter to encompass Bluetooth Beacon technologies into the use of the Advanced Data Trigger Mobile Tour Delivery System discussed above.

This not only solves the issues discussed in the "challenges" sections below, it also creates a more interactive experience for the End User.

3.2 Background

A Bluetooth Beacon is a device which utilizes a limited-range wireless connection to facilitate "homing in" on the Bluetooth Beacon using a Bluetooth enabled device. The Bluetooth transceiver 55 of personal electronic device 25 may be configured to connect to a Bluetooth Beacon so as to enable personal electronic device 25 to provide instructions to the End User to facilitate movement towards (or away from) a particular Bluetooth Beacon. Since a Bluetooth Beacon relies on a short-range radio signal that is relatively unaffected by surrounding objects and does not require satellite guidance (unlike GPS), a Bluetooth Beacon is particularly well-suited for indoor applications where it is not possible to receive a GPS signal, or applications in which exhibits are close together.

By way of example but not limitation, if an End User visits a location with a Bluetooth Beacon-enabled tour (e.g., a museum) and the End User wants to take a tour of that location, the End User has an option of a self-guided audio tour that can be played on the End User's personal electronic device 25 (e.g., a smartphone or other mobile device such as a tablet). The personal electronic device 25 (e.g., a smartphone/other mobile device) has connectivity to WiFi/Cellular/GPS/Bluetooth as discussed above (i.e., via wireless transceiver 45, via GPS receiver 50 and via Bluetooth transceiver 55).

The End User can download a mobile application to their personal electronic device 25 (e.g., their smartphone/other mobile device) that can be used to guide the End User to specific locations (e.g., 18th century paintings).

Each location of interest is assigned a Bluetooth Beacon and a name for the point of interest (e.g., the Mona Lisa).

With the mobile application, when the smartphone/other mobile device of the End User acquires the Location Signal from the Bluetooth Beacon (e.g., the location of the Mona Lisa via the Bluetooth Beacon signal) an appropriate audio file is played on the End User's personal electronic device 25 (e.g., their smartphone/other mobile device) via the mobile application.

The mobile application on the smartphone/other mobile device could have multiple locations (each of which has its own Bluetooth Beacon associated to it) for the End User to follow in a group. This grouping then makes the End User a themed grouping or a tour path, such as the aforementioned standard tour path 85.

Figure 14:
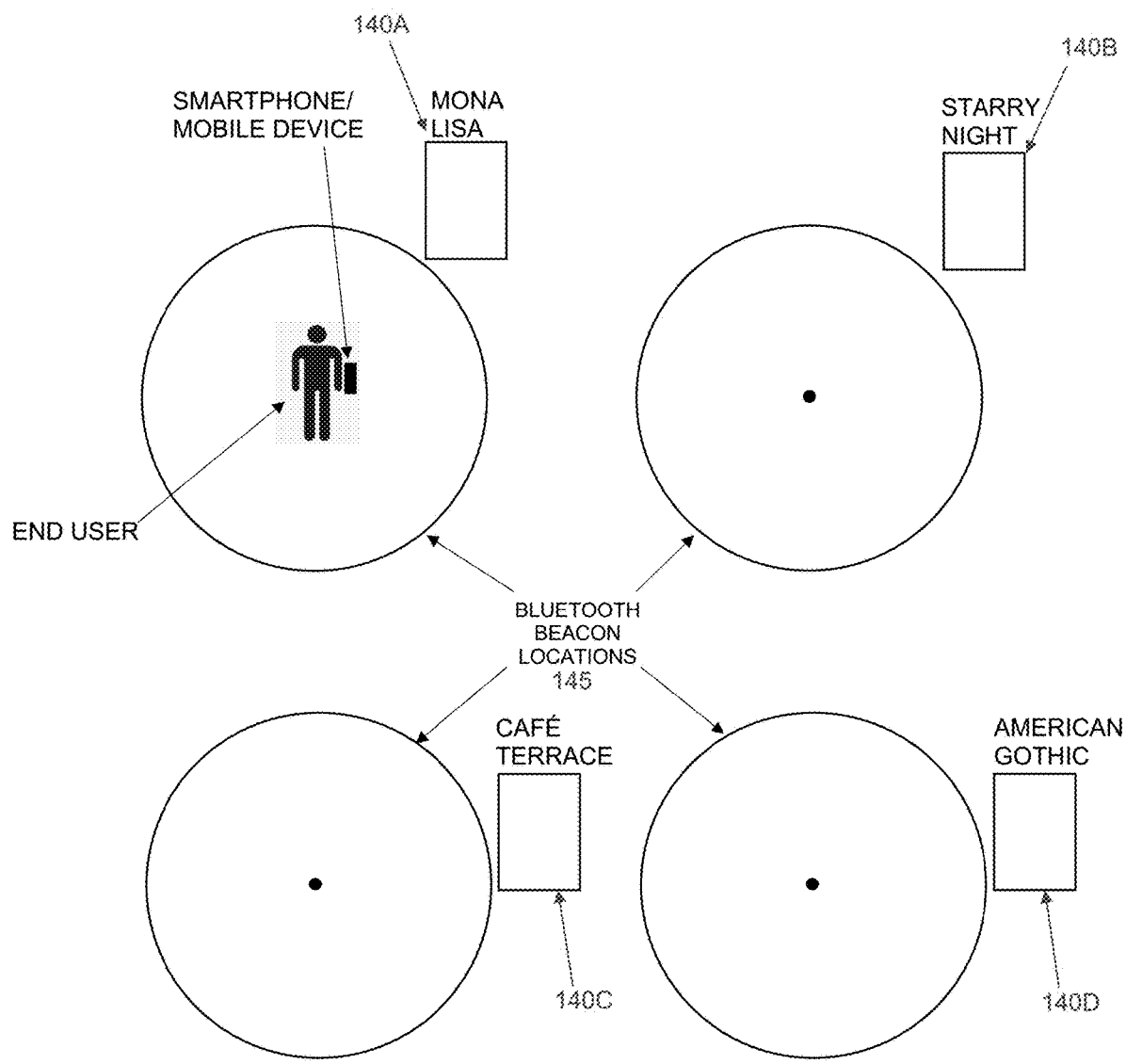
FIGS. 14-17 are schematic views showing aspects of a tour path assigned according to Bluetooth beacons.

FIG. 14 shows four exhibits (e.g., paintings) 140A, 140B, 140C, 140D with their associated Bluetooth Beacon Locations 145. The End User begins at the first Bluetooth Beacon Location 140A. When the End User moves to each subsequent Bluetooth Beacon Location 140B, 140C, 140D, an audio file specific to each of those Bluetooth Beacon Locations 140B, 140C, 140D is played.

3.3 Challenges Faced by Current Bluetooth-Based Systems (The Prior Art) and the Solutions Provided by the Advanced Data Trigger (ADT) Mobile Tour Delivery System Below are described a limited number of examples that create challenges when using Bluetooth Beacon technology for Tours, and describes how the challenges can be solved by using the system of the present invention.

3.3.1 The Tour Creator is Unable to have Multiple Exhibits (i.e., Exhibits which each have their Own Bluetooth Beacon Associated with it) in Close Proximity to One another in a Tour If locations/exhibits/ADTs (i.e., the exhibits on the tour) are located too close to one another they will trigger other Bluetooth Beacon Audio/Video files. While there is more control over the trigger distance, this approach still has limits.

Figure 15:
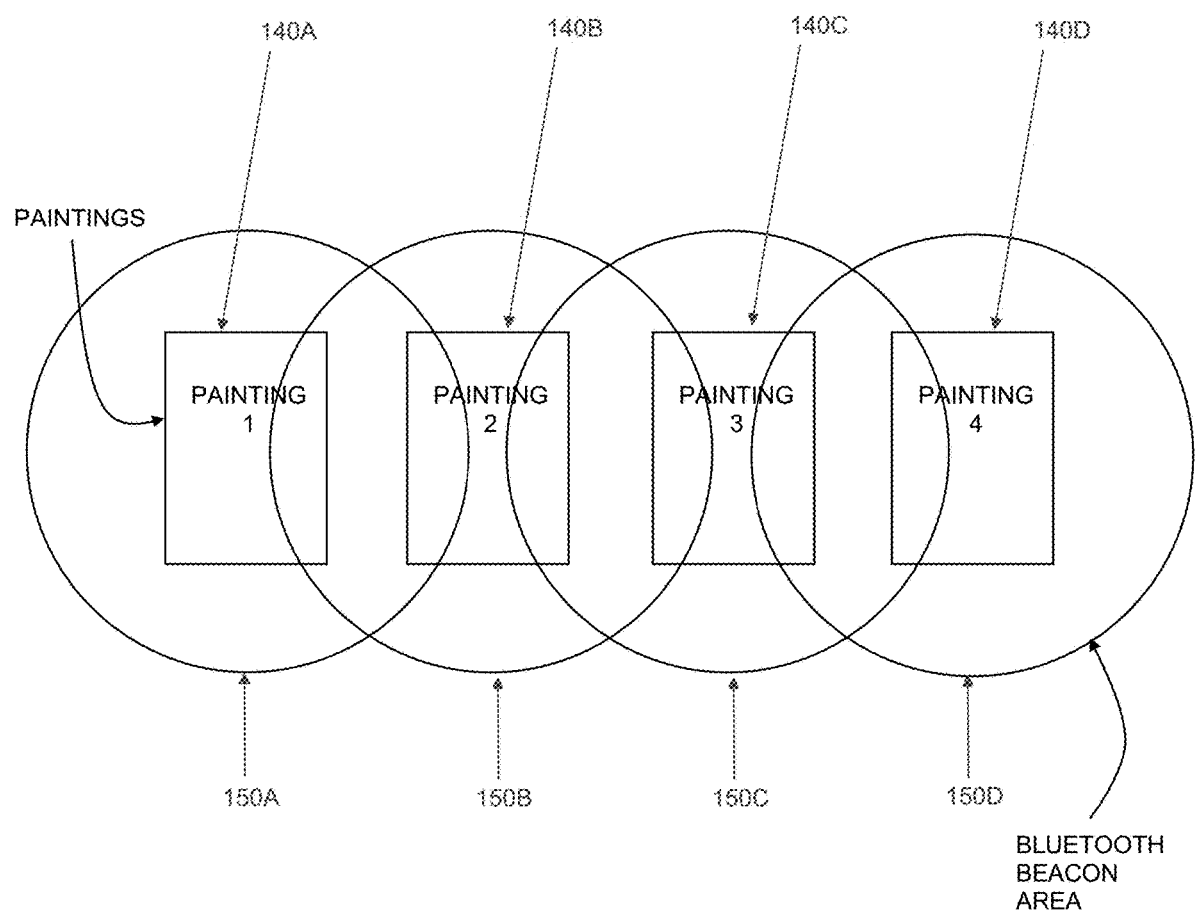

FIG. 15 shows four exhibits (i.e., 4 paintings) 140A, 140B, 140C, 140D located in close proximity to one another. In the scenario depicted in FIG. 15, the exhibits (i.e., the paintings) are too close to one another, i.e., the Bluetooth Beacon triggering areas 150A, 150B, 150C, 150D overlap due to the close proximity of each of the exhibits (i.e., the paintings).

With current (prior art) self-guided tours, it is not possible to create a tour including each of the paintings because the Tour Creator would be unable to control the Audio/Video files from being triggered at inappropriate times due to the overlapping Bluetooth Beacon triggering areas 150A, 150B, 150C, 150D.

3.4 The Invention: Advanced Data Trigger Mobile Tour Delivery System—Bluetooth Applications The system of the present invention is able to solve the aforementioned problem through multiple methods.

One way to address the aforementioned problems with the use of Bluetooth Beacons is for the Tour Creator to choose Data Delivery Styles (see above) for individual Bluetooth Beacon Locations. For example, the Tour Creator may choose a Bluetooth Beacon Location that is set to "Play until End" which enables the audio/video file associated with that Bluetooth Beacon Location to play until the end of the audio/video file so that the mobile application is not looking for the next Bluetooth Beacon Location on the tour path until the audio/video file associated with the first Bluetooth Beacon Location has completed playing. Once the audio/video file is finished playing, the mobile application (i.e., the application running on personal electronic device 25) looks for the next Bluetooth Beacon Location on the tour path. With this Data Delivery Style, the End User is able to listen/retrieve all the data associated with each Bluetooth Beacon Location, if desired.

The Tour Creator is also able to make "opt in" choices for particular exhibits (e.g., paintings) by choosing the aforementioned Data Delivery Style "Notification Point". For this Data Delivery Style, the End User receives Notifications from the mobile application running the Tour on the End User's personal electronic device 25 (e.g., a smartphone/other mobile device). By way of example but not limitation, the Notification may say the painting's name as the notification, such as "Mona Lisa". If the End User wants to listen/view the audio/video file associated with the notification, the End User can "opt in" by performing an action on personal electronic device 25, such as double tap or click. Once the End User "opts in", the Data Delivery Style for the audio/video file may be configured as "Play to End" so that the audio/video file plays until the end without triggering another Bluetooth Beacon Location. Each Bluetooth Beacon Location is assigned an order for triggering. This way each Bluetooth Beacon Location is presented in the order specified by the Tour Creator.

Figure 16:
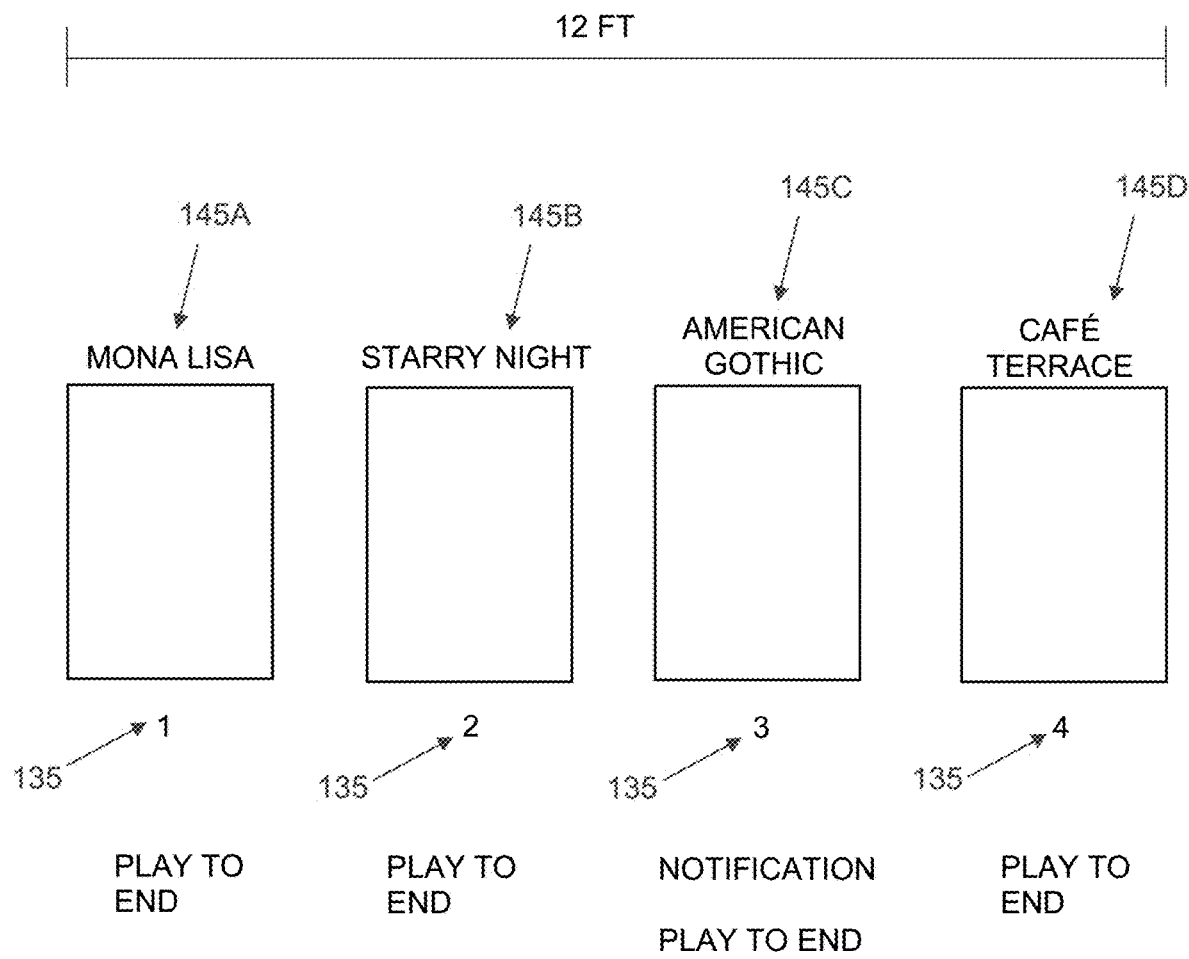

FIG. 16 shows an example where each Bluetooth Beacon Location 145A, 145B, 145C, 145D is assigned an order number 135 and Data Delivery Style by the Tour Creator, e.g., "Play until End" and/or "Notification Point". This enables the Tour Creator to present items in close proximity to one another without triggering Audio/Video files at inappropriate times.

3.4.1 The End User Cannot "Cross Over" Other Bluetooth Beacon Locations

If the End User crosses over another Bluetooth Beacon Location 145 (e.g., from a first Bluetooth Beacon Location 145A to a second Bluetooth Beacon Location 145B) the Bluetooth Beacon Location for the second location is triggered and the audio/video file associated with that Bluetooth Beacon Location will play. This makes Bluetooth Beacon Locations less convenient and less controllable, and thus less likely to be used by a Tour Creator when creating a tour.

Figure 17:
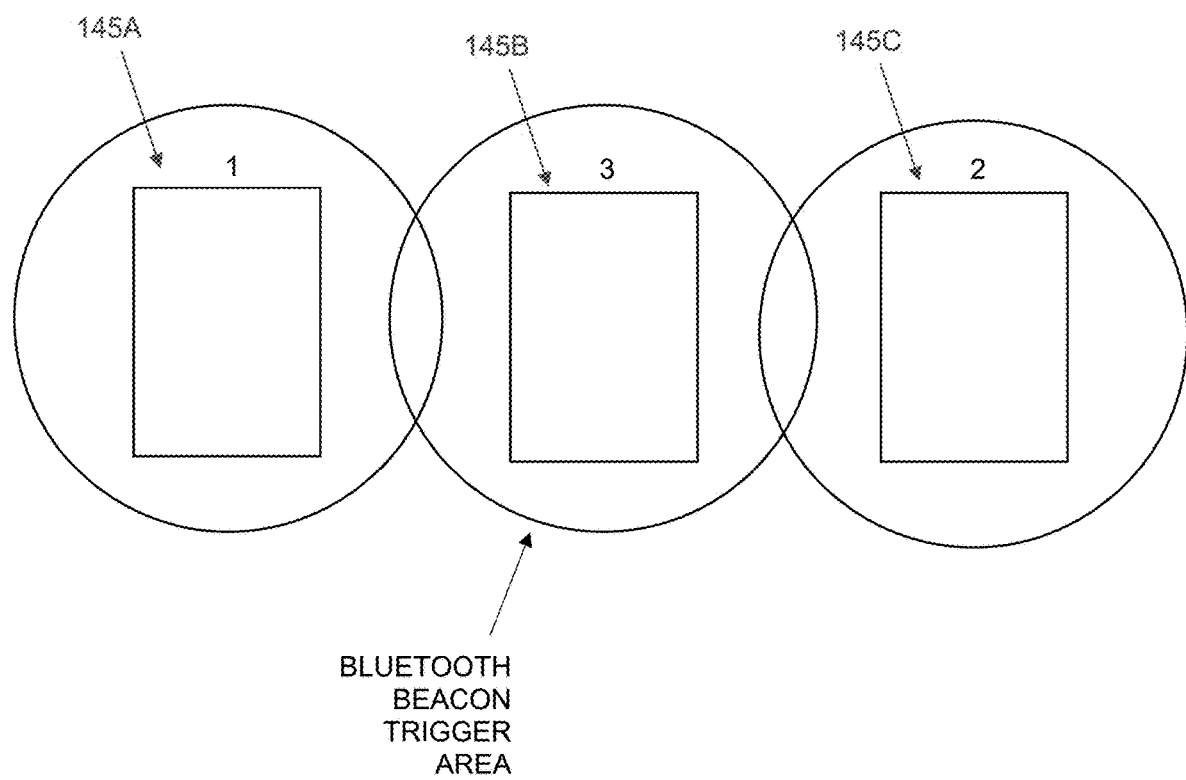

By way of example but not limitation, as shown in FIG. 17, the Tour Creator cannot create a tour where the End User needs to walk through Bluetooth Beacon Location 145B (indicated at 3 in FIG. 17) in order to go to Bluetooth Beacon Location 145C (indicated at 2 in FIG. 17), since this would trigger Bluetooth Beacon Location 145B.

The Advanced Data Trigger (ADT) Mobile Tour Delivery System of the present invention is able to solve this problem by using the Data Delivery Style "Play Until End" for one or more of the Bluetooth Beacon Locations 145A, 145B, 145C, and by assigning order numbers 135 to the Bluetooth Beacon Locations. This allows the End User to "cross over" Bluetooth Beacon Locations to reach other Bluetooth Beacon Locations without triggering them.

3.4.2 The Tour Creator does not know the Orientation of the End User

The lack of control over the orientation of the End User makes a tour more complicated for the Tour Creator to present to the End User.

This also makes a tour less interactive for the End User.

The system of the present invention solves this problem by using the Audio Style Choice "9 Axis IMU Sensor" which is facilitated using IMU 60 of personal electronic device 25. The Audio Style Choice "9 Axis IMU Sensor" (i.e., the provision of an IMU 60) allows the Tour Creator to have control over how the tour is delivered to the End User depending upon the orientation of the End User (i.e., which way the End User is facing) so as to present Audio/Video files for Bluetooth Beacon Locations to the End User in a more interactive and informational fashion.

3.4.3 The End User Cannot "Opt In" to Audio/Video Files

With existing self-guided audio tours, once the End User enters a Bluetooth Beacon Location, the audio/video is forced played on the mobile application. That is, the End User does not have the option to "opt in" to listening to the audio/video.

The system of the present invention solves this issue by using the aforementioned Data Delivery Style "Notification Point". The "notification point" feature plays a short audio sound to let the End User know that there is a Bluetooth Beacon Location 145 present and that the End User can be presented with an Audio/Video file, but the End User must perform an action on their personal electronic device 25 in order to "opt in", e.g., press a button on their smartphone, or double tap or perform an action on their headphones, smart glasses or other device.

3.4.4 Unable to Play Long Audio/Video Files without the End User Potentially Getting Lost With existing self-guided audio tours, if another audio/video file is presented during the tour, the mobile application stops playing the long audio/video file.

If the audio/video file plays, then it is complicated to give directions to the End User since the Tour Creator does not know exactly where the End User is standing at that point in time.

This is solved by the present invention with the aforementioned Data Delivery Style "Play until End" with "Navigational Overlays" to direct the End User (see above).

More particularly, the Advanced Data Trigger (ADT) mobile tour delivery system of the present invention solves this issue by using an additional Data Delivery Style, the aforementioned "Navigational Overlays" feature (see above). With the "Navigational Overlays" Data Delivery Style, if the End User needs directions, the audio/video file is paused, and navigation directions are given to the End user; once the directions have been given to the End User, the original audio/video file re-commences.

4. ADT Mobile Tour Publishing Platform 4.1 Background

As noted above, in one preferred form of the invention, the Tour Creator creates a self-guided tour on a web-based Tour Developer application and publishes it (i.e., stores the tour instruction file 30 in tour database 20 on central server 15). The Tour (i.e., tour instruction file 30) resides on a server (i.e., central server 15) that pushes the Tour to a mobile application running on a smartphone/other mobile device where End Users can download and access the Tour.

Figure 18:
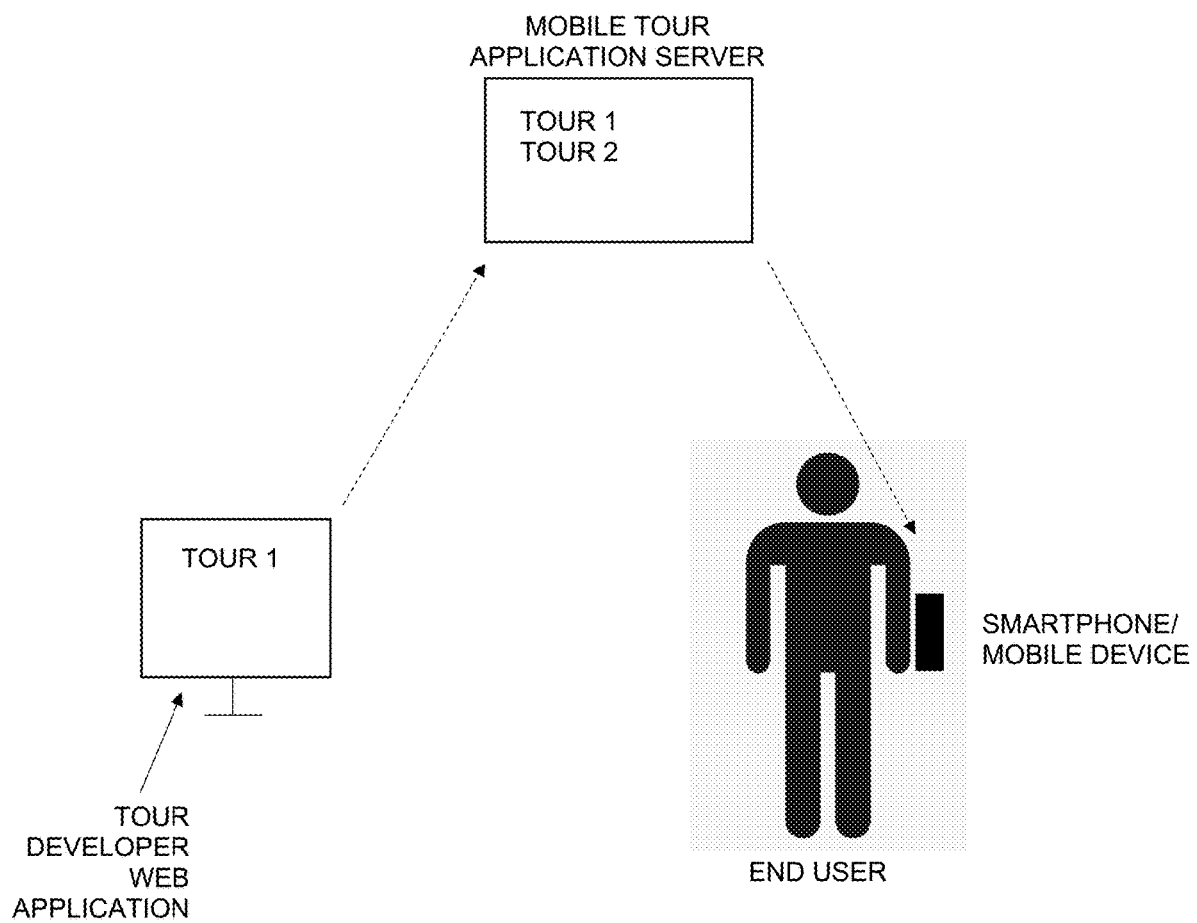
FIGS. 18 and 19 are schematic views showing various aspects further aspects of a novel mobile tour delivery system formed in accordance with the present invention.

FIG. 18 shows current (prior art) Tour Developer Web Applications that allow Tour Creators to publish a Tour to a mobile application. Note however, that current (prior art) Tour Developer Web Applications only allow the Tour Creator to publish the Tour to one (i.e., a single) mobile application (e.g., a proprietary mobile application).

4.2 Challenges Faced with Current (Prior Art) Tour Developer Web Applications

Prior art self-guided tour developer web applications and means of delivery of self-guided tours suffer from significant drawbacks. By way of example but not limitation, current (prior art) publishing platforms do not allow the Tour Creator to publish their Mobile Tour (GPS/Bluetooth) as an integrated feature section on an existing mobile application (e.g., a branded company mobile application, such as a hotel, running, travel, airline mobile application).

More particularly, with prior art publishing platforms, the Tour Creator (e.g., a company) cannot publish directly to their mobile application. By way of example but not limitation, consider the case of a large hotel chain. Such a large hotel chain (i.e., the "Tour Creator") may like to leverage the investment of their mobile application by adding the feature of a self-guided tour that the End User (e.g., a hotel guest) can download and run using the large hotel chain's existing mobile application (i.e., to integrate the Mobile Tour on the hotel chain's preexisting mobile application).

However, current (prior art) publishing platforms only publish to one destination (i.e., one mobile application). This creates issues for the Tour Creator, who may wish to publish the self-guided tour (i.e., the Mobile Tour) to multiple mobile applications, such as an existing competitor tour application and to the Tour Creator's own existing application (e.g., a branded mobile application of a company such as a large hotel). For the Tour Creator to publish the self-guided tour (i.e., the Mobile Tour) to a different mobile application would typically incur a high cost in expenses, and increased time in development, as the Tour Creator needs to customize the tour to enable it to be published to a different mobile application.

4.3 The Invention: ADT Mobile Tour Publishing Platform

The present invention addresses the issued discussed above by enabling a Tour Creator to publish a self-guided tour (i.e., the Mobile Tour) quickly and easily to multiple (i.e., different) mobile applications.

More particularly, with the present invention, once the Tour Creator has created a Tour (i.e., in the manner discussed above) the Tour Creator would be presented with publishing options.

The "publishing options" presented to the Tour Creator include, but are not limited to the following publishing options.

4.3.1. Publishing to Existing Third-Party Applications

The Tour Creator may publish the self-guided audio tour through an application programming interface (API) to a designated feature section on an existing mobile application (e.g., an airline, hotel, travel company mobile application). This permits integration of the self-guided audio tour with a company's existing mobile application, allowing for support of the publication of Tours to that existing mobile application. The existing mobile application is then able to process the tour data and deliver the self-guided tours (i.e., through the company's mobile application) as published from the system of the present invention. Integration with a company's existing mobile application is effected by:

(a) Giving the Tour Creator access to a development tool (which is sometimes hereinafter referred to as the "Tour Developer Web Application"); and (b) providing an easy integration to with an existing mobile application, enabling it to process and run the pushed Mobile Tour data generated by the Advanced Data Trigger (ADT) Mobile Tour Delivery System.

The present invention facilitates connecting a Mobile Tour Section of their mobile application through an API to the Mobile Tour Data Server (i.e., central server 15).

The Mobile Tour Data Server (i.e., central server 15) then pushes the created content to the API of the existing mobile application. This arrangement enables the Mobile Tour data (i.e., tour instruction file 30) to run on the existing mobile application. This allows for the full functionality of the Advanced Data Trigger (ADT) Mobile Tour Delivery System to be utilized through the existing mobile application.

Overall, this approach saves a large amount of development resources for the organization (e.g., a large company, hotel, etc.) having existing mobile applications. Such an organization (e.g., a large company, hotel, etc.) is able to launch self-guided tours quickly, without losing the organization's investment in developing and promoting their existing mobile application. Third-party existing mobile applications have access to the features described above. This approach allows the Tour Creator to quickly, easily and economically offer tours as a feature of their existing mobile application, whereas with prior art approaches, offering tours was time-consuming and expensive to create and publish Mobile Tours through their existing mobile application. It will be appreciated that the novel approach of the present invention allows third parties to leverage further marketing and promotions to drive more traffic to their existing mobile application. All data "pushed" from the Mobile Tour Data Server (i.e., central server 15) instantly appears in the existing mobile application (i.e., the third-party mobile application), enabling End Users to run tours off of the existing mobile application. The Mobile Tour Data (i.e., tour instruction file 30) is stored in the central server (i.e., central server 15) which has the ability to "push" the Mobile Tour data (i.e., tour instruction file 30) to the existing mobile application.

4.3.2 Publishing to a Proprietary Mobile Application

The present invention also allows the Tour Creator to publish Tours (e.g., self-guided audio tours) to a general public mobile application that holds all submitted tours. It is a main hub for tours that accepts tours from all publishers. This general public mobile application may be called "WalknTours".

4.3.3 Publish to a Stand-Alone Mobile Application

The present invention also allows the Tour Creator to publish Tours to a mobile application that is customized for any organization and permits the Tour Creator to only publish tours the Tour Creator has created for that organization.

Figure 19:
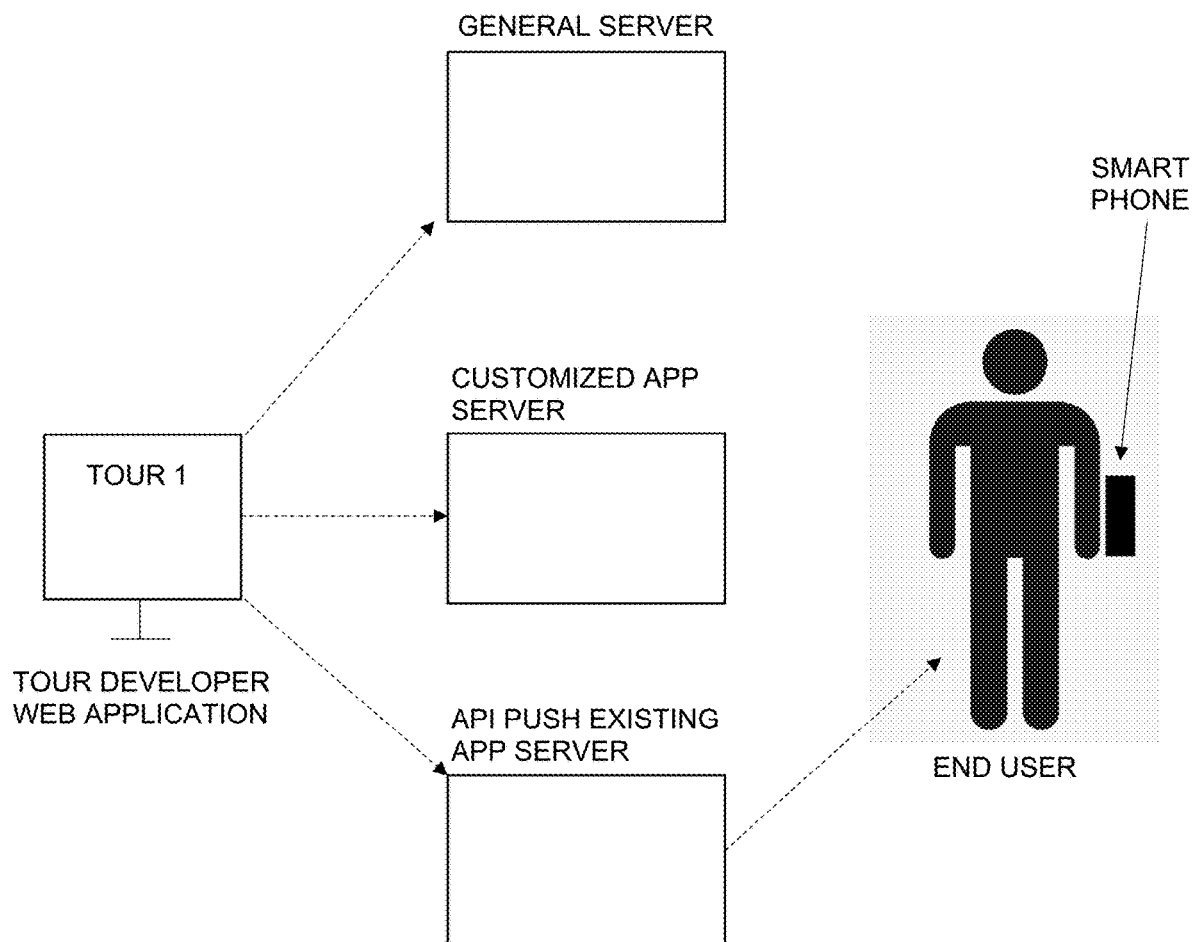

FIG. 19 shows that the Tour Developer Web Application (i.e., the application used by the Tour Creator to create a self-guided tour using the Tour Creator's computer 10) which provides the ability to publish Tours to multiple locations (i.e., multiple servers, including central server 15). In the example shown in FIG. 19, the Tour Developer Web Application publishes to three locations: (i) a general public mobile application ("WalknTours"), (ii) a customized mobile application (i.e., where the Tour Creator publishes to the Tour Creator's own, proprietary, mobile application), and (iii) publication to a Mobile Tour Section of an existing mobile application through an API (i.e., the API "pushes" the tour to an existing mobile application). The End User then accesses the Tour through the existing mobile application on their phone (which could either be the general public mobile application ("WalknTours"), a customized mobile application, or a Mobile Tour Section of a mobile application). All of these approaches offer the same experience, albeit through different mobile applications.

5. Interactive Augmented Reality Data Delivery Style Choice Options for Advanced Data Trigger Mobile Tour Delivery System—GPS/Bluetooth 5.1 Background—Current State of Audio Tours As discussed above, self-guided audio tours are known in the art. With such prior art self-guided audio tours, visitors to a new city or museum have an option to take an application-based audio tour that can be played on the End User's smartphone or other mobile device (e.g., a tablet). Such application-based self-guided audio tours can be downloaded onto the End User's smartphone or other mobile device (e.g., a tablet). When the application is used, the application triggers audio files that are played at a specific location determined using GPS coordinates or Bluetooth Beacon Locations.

With prior art self-guided audio tours, the audio files that are played are "static" Audio files, meaning that the audio is presented much like one would hear on a podcast, the radio, a song, or any other audio that listened to on a daily basis. In other words, the audio played during current audio tours is played with no interaction on the part of the End User.

5.2 Challenges Faced by Current Audio Tours

There are multiple issues with the current state of self-guided Audio tours, as will hereinafter be discussed in further detail.

Current audio tour applications do not utilize an IMU, and hence are unable to detect and utilize the orientation of the End User. Thus, current audio tour applications do not know the orientation of the End User (i.e., which direction the End User is facing) when the End User is engaged in the tour.

Since current audio tour applications do not utilize an IMU and hence do not know the orientation of the End User when the End User is engaging in a tour, current audio tour applications are unable to create and deliver "dynamic" (i.e., spatial) audio/data experiences. The present invention improves upon current audio tour applications that do not provide options for "dynamic" (spatial) audio in current applications by utilizing the aforementioned IMU 60 to determine the End User's orientation while the End User is engaged in a tour, thereby allowing for interactive experiences for the End User. Such "dynamic" (spatial) audio/data experiences could be considered Audio Augmented Reality. With the present invention, the audio interacts with the End User as if it were reality, but changes the nature of the interaction based on the End User's behavior and orientation. Thus, a significant limitation of prior art current audio tour application is that the End User is unable to interact with the tour experience (i.e., the End User has no options to "opt in" and no interactive experiences).

5.3 The Invention: Interactive Augmented Reality Data Delivery Style Choice Options for Advanced Data Trigger Mobile Tour Delivery System—GPS/Bluetooth The present invention comprises audio delivery styles which may be provided as choices/options in the Advanced Data Trigger Mobile Tour Delivery System of the present invention discussed above. The audio delivery style choices are sometimes referred to herein as "Data Delivery Styles".

The innovative Data Delivery Styles provide new features during a mobile tour that enable several new and improved ways of delivering audio during a self-tour.

5.3.1 Interactive Augmented Reality

The present invention allows a Tour Creator to develop interactive Augmented Reality experiences. More particularly, with the interactive Augmented Reality experiences of the present invention, the Tour Creator can: know the orientation of the End User (e.g., via the aforementioned IMU 60 of an End User's personal electronic device 25), and can calibrate the End User's orientation with the IMU 60 (e.g., with a 3/6/9 axis IMU sensor or other relevant sensors, such as the aforementioned IMU 60) of personal electronic device 25, e.g., a smartphone and/or other mobile devices (e.g., a tablet) that can collect this data. The Tour Creator can then place Dynamic (Spatial) Audio trigger locations in multiple orientations (i.e., left/right/forward/back) and distances (i.e., 5 feet or 50 feet) relative to a location/exhibit vis-à-vis the End User. Additionally, the Tour Creator can place multiple Dynamic (Spatial) Audio/Data trigger Points in one location (GPS/Bluetooth) and control the order that the trigger Points are presented to the End User.

5.3.2 Audio Augmented Reality

The present invention also allows the Tour Creator to develop audio augmented reality experiences. The audio augmented reality experiences feature allows the End User to have Audio Augmented Reality experiences when interacting with GPS coordinates and/or Bluetooth Beacon locations during a tour.

By way of example but not limitation, an audio augmented reality experience may allow the End User to hear dynamic (spatial) audio, e.g., the audio would sound as if it is coming from the left of the End User, when the End User turns to look, now it sounds as if the audio is coming from in front of the End User, and when the End User turns around it sounds as if the audio is behind the End User. By way of further example but not limitation, and audio augmented reality experience may allow the volume of the audio delivered to vary according to how far the End User is located from a location/exhibit, e.g., if the End User walks closer to the sound it grows louder. In other words, the audio has an actual positioning.

5.3.3 Interact with the Tour Experience

The present invention also allows the Tour Creator to develop audio augmented reality experiences that permit interaction between the End User and a particular location/exhibit. By way of example but not limitation, the tour may be configured by the Tour Creator such that if the End User looks at a point, for example, at a statue (i.e., an exhibit), the audio will play, and if the End User looks away from the statue (i.e., the exhibit) the audio stops playing. If desired, the Tour Creator can configure the tour such that the End User can "opt in" to tour experiences by double tapping on their personal electronic device 25 (e.g., a smartphone and/or other mobile device such as a tablet, headphones, etc.). Furthermore, if desired, the Tour Creator can configure the tour such that the End User can change their orientation and then interact with the audio.

5.4 Interactive Augmented Reality Data Delivery Style Choice Options

Below are the descriptions of each Data Delivery Style of the Advanced Data Trigger Mobile Tour Delivery System that may be used with the present invention.

5.4.1 Dynamic (Spatial) Audio Positioning

Using personal electronic device 25 (e.g., a smartphone and/or other mobile device such as a tablet, headphones, etc.), the present invention uses IMU 60 (e.g., a 3/6/9 axis IMU sensor or relevant sensors) of the personal electronic device 25 (e.g., a smartphone and/or other mobile device such as a tablet, headphones, etc.) to detect the orientation of the End User vis-à-vis a location/exhibit specified on a tour.

Knowing the orientation of the End User enables placement of dynamic (spatial) audio files for specific orientations of the End User. These dynamic (spatial) audio files include: Left, Right, Behind, In front 5.4.2 Create Augmented Reality Experiences As noted above, the Tour Creator can configure the tour such that the audio delivered to the End User varies depending on the End User's movement relative to a specific location/exhibit.

By way of example but not limitation, the tour can be configured such that if the End User hears a voice to their left and the End User:

1. Turns left, then the voice is heard as if it were in front of the End User
    a. And if the End User walks forward (i.e., toward the voice) the voice gets louder
2. Turns right, then the voice is heard as if it were behind the End User
    a. And if the End User walks forward (i.e., away from the voice) the voice gets softer
3. Turns around (i.e., 180 degrees), the voice is heard as if it were to the End User's right The Advanced Data Trigger Mobile Tour Delivery System of the present invention is able to deliver audio in multiple directions by implementing an order placement as discussed above. Each audio file heard by the End User is assigned a GPS/Bluetooth Location. In this case, there may be many audio files that are provided at the same location. Using an order placement scheme enables control over the delivery of multiple dynamic audio files during one tour experience.

The Tour Creator is able to "place" (i.e., situate) Dynamic (spatial) Audio experiences based on the orientation of the End User relative to a particular location/exhibit so as to control the experience and direction that they are orientated in and interacting in. The Tour Creator can also control the flow of the presented dynamic audio using the Advanced Data Trigger Mobile Tour Delivery System of the present invention.

The Tour Creator can also create Audio Augmented Reality experiences anywhere that has a GPS signal or Bluetooth Beacon. The resulting tour experience for the End User is that the End User hears audio augmented reality and interacts with it based on their orientation relative to a particular location/exhibit.

Figure 20:
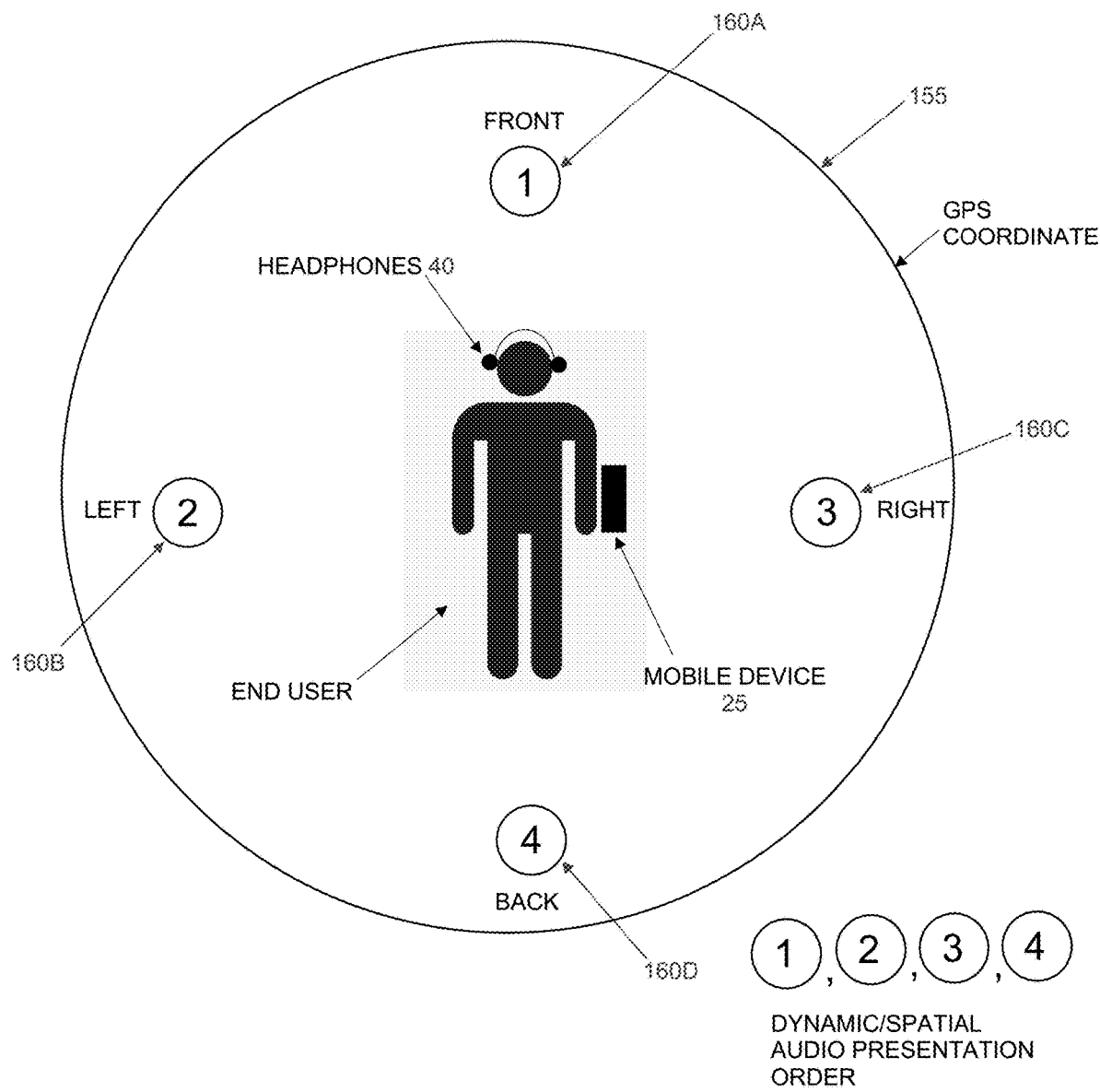
FIG. 20 is a schematic view showing various aspects of a dynamic audio feature formed in accordance with the present invention.

FIG. 20 shows the End User with personal electronic device 25 (e.g., a smartphone or other mobile device) and acoustic output means 40 (e.g., headphones) at a single GPS location 155. Using the present invention, Tour Creator can configure the tour such that the End User is presented with 4 data/audio trigger files 160A, 160B, 160C, 160D in one location (i.e., GPS location 155). Each data/audio trigger file 160A, 160B, 160C, 160D is presented from a different dynamic spatial direction (i.e., each data/audio trigger file is configured to sound as if it is being emitted from a different spatial direction) based on the orientation of the End User. Each data/audio trigger file 160A, 160B, 160C, 160D plays in sequence (i.e., according to the order number assigned), and with the interaction of the End User with the application on their mobile device.

5.5 GPS Dynamic (Spatial) Audio Positioning

As noted above, the present invention permits a Tour Creator to configure a tour such that dynamic (spatial) Advanced Data Triggers (ADTs) are placed at a particular GPS Coordinate. When this feature is utilized, the tour is configured such that when the End User enters the trigger area of the GPS coordinate, an audio file is played. This is achieved by using the personal electronic device 25 (e.g., a smartphone and/or other mobile device such as a tablet, headphones, etc.) of the End User. The present invention uses the aforementioned IMU 60 (e.g., a 3/6/9 axis IMU sensor), and/or other relevant positioning sensors, to detect the orientation of the End User. Using the GPS receiver 50 of personal electronic device 25, the End User's position (i.e., GPS coordinates) is known and the End User's position is calibrated. The End User's orientation relative to the GPS coordinate is gathered from the calibrated position.

Knowing the End User's orientation allows for the creation of dynamic (spatial) audio experiences around their specific orientation.

5.5.1 Create Augmented Reality Experiences

As noted above, the Tour Creator can configure the tour such that the audio delivered to the End User varies depending on the End User's movement relative to a specific location/exhibit.

By way of example but not limitation, the tour can be configured such that if the End User hears audio configured as a voice to the End User's left and the End User turns left, the voice is heard as if it were in front of the End User (i.e., the End User is now facing the sound of the voice). And if the End User walks forward, the voice gets louder. If the End User turns right, the voice is behind them. And if they walk forward (i.e., away from the sound of the voice), the voice gets softer. Now, if the End User turns around (i.e., 180 degrees), the voice is to their right.

By way of example but not limitation, consider a tour configured such that a dynamic (spatial) GPS Coordinate is located at the Sam Adams Statue in Boston, Mass. and the End User is standing 50 feet directly in front of the statue. If the End User moves forward, the audio that is played for the End User gets louder. If the End User turns left the End User hears the audio as if the audio is coming from their right. If the End User turns around, the audio sounds as if it is coming from behind the End User. If the End User moves away from the statute, the audio heard by the End User becomes softer.

As discussed above, it is also possible for the Tour Creator to configure the tour such that different audio files are delivered to the End User from multiple directions by implementing an order number as discussed above. Where this feature is utilized, each audio file heard is assigned a GPS/Bluetooth Location. In this case there may be many audio files that are at the same location (e.g., four different data/audio trigger files 160A, 160B, 160C, 160C as shown in FIG. 20, or a different number of data/audio trigger files). Using an order placement of the triggers, the present invention is able to control the delivery of multiple dynamic audio files in one tour experience. The resulting experience is that the Tour Creator is able to place dynamic (spatial) Audio experiences at GPS coordinates or Bluetooth Beacon locations, and using the orientation of the End User (i.e., as determined by IMU 60 discussed above) the present invention allows the Tour Creator to interact with the Audio Augmented Reality experience so as to control the flow of the presented dynamic audio using the Advanced Data Trigger Mobile Tour Delivery System, and to create Audio Augmented Reality experiences anywhere that has GPS signal or Bluetooth Beacons.

The resulting experience for the End User is that the End User hears audio augmented reality and interact with it based on their orientation. This feature can make inanimate objects feel as if they are "alive" (i.e., "dynamic").

5.5.2 "Opt In" to the Tour Experience—Notifications

If desired, the data/audio trigger files may be configured by the Tour Creator such that when the End User arrives at a specified GPS coordinates or Bluetooth Beacon location, the End User is presented with an audio notification. By way of example but not limitation, when the End User arrive at specified GPS coordinates or Bluetooth Beacon location for a Leonardo Da Vinci exhibit, such an audio notification could say "double tap now to learn more about Leonardo Da Vinci". When the End User performs an action (e.g., double tapping display 35 of personal electronic device 25), then the second set of data/audio files would be played for the End User. In the foregoing example, such second set of data/audio files may be the full story about Leonardo Da Vinci.

Alternatively, where such a data/audio trigger is activated by the End User (e.g., by the End User arriving at the specified GPS coordinates or Bluetooth Beacon location), the End User has the option of not "opting in", and instead just walking on (i.e., continuing along the tour path). This may be a helpful feature for use in a museum where there are many paintings, however, the End User is not interested in hearing a second set of data/audio files about all of the paintings. That is, the End User may only "opt in" to the locations that the End User is interested in.

The Tour Creator can use various types of triggers to allow the End User to "opt in" to the optional audio experience. Some exemplary triggers include: the End User "Double Taps" their headphones, the End User shakes their personal electronic device 25 (e.g., a smartphone and/or other mobile device), the End User presses the camera button on their personal electronic device 25 (e.g., a smartphone), and other interactive experiences that do not require opening/unlocking the personal electronic device 25 (e.g., a smartphone and/or mobile device) may also be provided 5.6 Focus Point Augmented Reality Dynamic (Spatial) Audio When the End User enters a GPS coordinate or Bluetooth Beacon location the Tour Creator can configure the tour program such that the End User triggers an audio file that can only play when they are looking in a single (specified) direction. By way of example but not limitation, if the tour specifies that an audio file plays when the End User looks at a particular painting, the audio/data file plays when the End User is looking at the painting (i.e., when the End User is oriented so as to be facing the painting). If the End User looks away from the painting (i.e., the orientation of the End User is changed relative to the painting), then the audio/data file plays at a lower volume until at a set angle (e.g., 45 degrees, full left turn relative to the painting), at which it stops playing. If the End User looks back at the painting (i.e., is oriented so as to face the painting again), the audio starts to play again. If the End User turns and walks away from the painting, the audio softens. If the End User approaches the painting, the audio grows louder.

As discussed above, using the personal electronic device 25 (e.g., a smartphone and/or other mobile device such as, a tablet, headphones, etc.) of the End User, the present invention uses the IMU 60 (e.g., a 3/6/9 axis IMU sensor), and other relevant positioning sensors, to detect the orientation of the End User. This feature permits the Tour Creator to customize the delivery of audio files depending upon the orientation of the user relative to a location/exhibit. When utilizing this feature, the End User's position is calibrated as discussed above, the End User's orientation/direction they are facing is gathered from the calibrated position, and once the End User's orientation is "locked in" (i.e., recognized), the End User's orientation is used to track where and how much the End User moves.

5.6.1 Create Augmented Reality Experiences

As discussed above, the present invention allows the Tour Creator to design a tour such that the End User is able to interact with inanimate objects, i.e., paintings, statues, walls, etc. during the tour. The resulting experience is that the Tour Creator is able to place dynamic (spatial) Audio experiences at GPS coordinates or Bluetooth Beacon locations. Such dynamic (spatial) Audio experiences include the orientation of the End User with the dynamic (spatial) Audio experiences at GPS coordinates or Bluetooth Beacon locations which allows the End User to interact with the Audio Augmented Reality experience (i.e., to interact with inanimate objects).

5.6.2 Control the Flow of the Presented Dynamic Audio Using the Advanced Data Trigger Mobile Tour Delivery System of the Present Invention As discussed above, the present invention allows a Tour Creator to create Audio Augmented Reality experiences anywhere that has GPS signal or Bluetooth Beacons. The resulting experience for the End User is that the End User hears audio augmented reality and can interact with it (e.g., an inanimate object) based on their orientation. Thus, the feature can make inanimate objects feel as if they are "alive".

5.7 Dig Deeper Data File Delivery Method—Tour Extension "Opt In"

As discussed above, the "Dig Deeper" feature discussed above, and/or other extensions on a tour, allow for an option on tours for the End User to break off from the current tour path. These are optional excursions and can be chargeable (i.e., the End User can "Opt In" by paying a fee to access the tour extension/"Dig Deeper" option).

The Dig Deeper Data File Delivery Method allows for a smooth flow of information for the End User to interact with. By way of example but not limitation, consider the following hypothetical tour: on Stop 2 (i.e., a particular location/exhibit) of a Tour, the End User is presented with a Dig Deeper option to take an optional excursion. If the End User elects to take the Dig Deeper optional excursion, and clicks the button in the application on their smartphone indicating the start of the Dig Deeper tour extension, the currently-playing audio/data for Stop 2 ends and the audio associated with the first stop of the Dig Deeper Audio Extension begins to play. The End User undertakes the Dig Deeper excursion, playing the audio/data for the optional excursion until the last stop of the Dig Deeper tour extension plays.

Once the End User has completed the Dig Deeper excursion and is returning back to the original tour stop, a new audio/data file plays, in place of the original Stop 2 audio/data file. When the End User reaches Stop 3 along the tour, the data/audio file triggers with the original Tour continuing. This is an "opt in" option for the End User. It is a choice: the End User can bypass this option if they have no interest in that particular tour extension. By way of example but not limitation, consider a situation in which the End User is at the Granary Burial Ground walking along a Freedom Trail tour in Boston, Mass. The End User encounters a Dig Deeper Tour Extension option that takes them on a 10 minute walk through the Granary Burial Ground. The End User can: choose to go into the Granary Burial Ground and listen to the tour extension by clicking a button on their smartphone/mobile device, which may be chargeable (i.e., the End User pays a fee to access the Dig Deeper Tour Extension for the Granary Burial Ground). However, inasmuch as this tour extension is optional, the End User could instead choose to skip the tour extension by simply walking along the tour route to the next stop.

Figure 21:
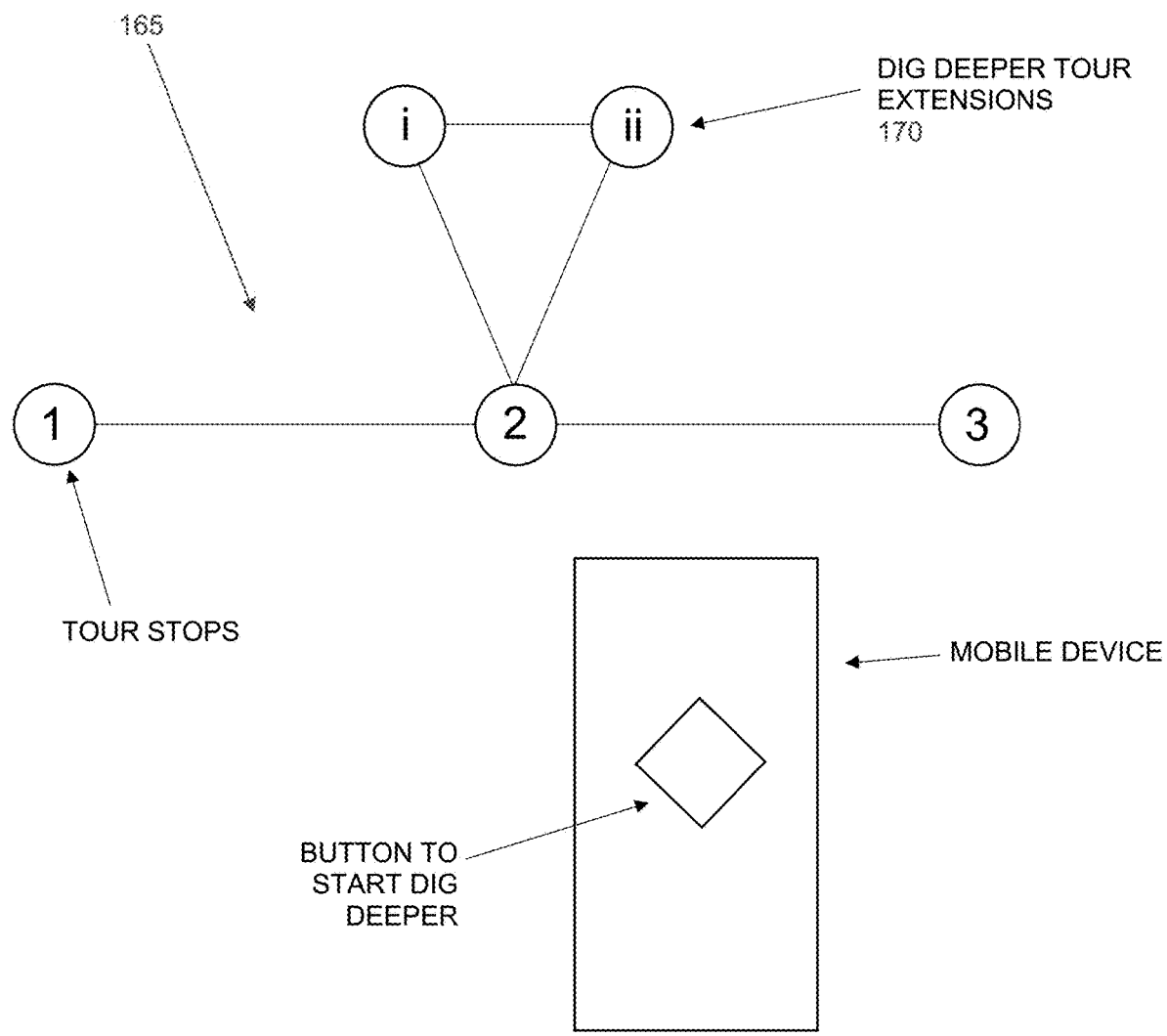
FIG. 21 is a schematic view showing further aspects of a Dig Deeper extension formed in accordance with the present invention.

FIG. 21 shows a tour path 165 having locations 1, 2, 3 disposed along the tour path, and a Dig Deeper extension 170 having locations i and ii disposed along the Dig Deeper extension. When the End User clicks a button on their personal electronic device 25 (e.g., a smartphone/mobile device), they can "opt in" to start Dig Deeper extension 170.

6. Tour by Numbers Mobile Tour Solution with Sound Innovation and Audio Text-To-Audio Translation Innovation for Mobile Tours 6.1 Background—Current State of Indoor Audio Tours (The Prior Art)

Currently, the most common prior art indoor audio tours use handheld devices that require the user to input a number into the handheld device and then the handheld device plays an audio file associated with that number. These handheld devices, while useful, present a large number of problems. Further, playing the recordings indoors presents even more challenges.

Of the indoor audio tour applications that are currently provided, these applications access the speaker of the mobile device (e.g., iPhone/iOS/Android) to play the audio files. When the speaker of the mobile device is used to play audio, the audio is very loud and can cause disruptions in many indoor locations. By way of example but not limitation, imagine 20 people playing audio on the speakers of their cellphones in a museum. Because of this issue, mobile tours often require headphones to be provided on site, or the mobile tours are not provided at all.

And, also of note, the "input a number" tours discussed above are not location-based—they can be played at any location at any time.

6.1.2 Challenges Faced when Playing Mobile Tour Audio from Mobile Devices Indoors There are multiple issues with the current state of mobile audio tours: By way of example but not limitation, one issue is that the End User has no control over the volume of the audio tour by the location hosting the tour. That is, current mobile device tours play audio that requires the user to use the speaker on their mobile device or headphones to listen to the tour. This causes a large disruption amongst guests, e.g., when everyone in a quiet museum is playing different audio files at different times on their speaker, it creates a loud and unfriendly environment. The visitors could lower their volume, but they have a choice—and they often turn the audio up to 100% volume to hear it. This is because mobile tour applications that play audio do not regulate the volume, so the user keeps it loud.

6.1.3 Challenge Faced Currently when Offering Audio in Mobile Tours in Multiple Languages There are multiple issues that arise when offering audio in mobile tours in multiple languages. To offer multiple languages, the location (e.g., museum) would need to record and upload each translation as a separate audio language file. As of now, handheld tours and apps have the users adding individual files to each tour language choice. It is time-consuming to record a separate audio file for each language. It is also time-consuming to load each language file on each device. Overall it takes a lot of time to add a multi-language tour to handheld devices or to app tours.

6.1.4 Challenges Associated with Location Awareness

There are also multiple issues with the current state of mobile audio tours and location awareness. Specifically, prior art handheld devices running the mobile tour generally play the audio anywhere (i.e., regardless of the location of the user). The audio can begin playing at any location, so they are not aware of the location of the handheld device within a mobile tour. This means the user could listen to the audio off-site. Many items on the tour require the user to be at the location. If they are not, the experience is not as effective. It also allows anyone to listen at any time. Many locations want the user to be on site to listen to mobile tour audio.

6.1.5 Challenges Faced by Handheld Devices

There are multiple issues with the use of handheld devices for mobile tours; some of these issues are discussed in detail below.

6.1.5.1 Management of Devices—Uploading Files/Management

With prior art mobile tour devices, in order to add a new audio tour number, or create a new location number, the audio needs to be downloaded to each device. However, it is time-consuming to connect each device to update them individually. Overall, it is not easy, and it is time-consuming, to update handheld devices.

6.1.5.2 Adding New Locations

Similarly, with prior art mobile tour devices, adding a new location requires updating an entire tour system. Overall, it is not easy, and it is time-consuming, to add a new location number.

6.1.5.3 Playing Video

In addition to the foregoing, some prior art mobile tour handheld devices do not have an option for video (i.e., no display/screen), other handheld devices need to upload videos individually.

6.1.5.4 Collecting IDs

When utilizing prior art mobile tour handheld devices, ID's or deposits are collected from visitors to use the handheld device. This creates a big cost for human resources. Sometimes visitors do not have an appropriate ID (note: in New York City, they cannot take passports as a form of ID). Without an appropriate ID, visitors are unable to use the handheld device.

6.1.5.5 Lost/Stolen/Broken Devices

In addition to the foregoing, with prior art mobile handheld tour devices, many handheld devices are lost, stolen or broken. The lost, stolen or broken handheld devices create a large cost to replace/fix. The lost, stolen or broken handheld devices create fines and costs to visitors. Since the handheld devices are hardware, they all eventually break.

6.1.5.6 Battery Charging

And, with prior art mobile handheld tour devices, batteries must be charged before handing the handheld devices out to visitors. The need for maintaining battery life creates complexity when dealing with hundreds or even thousands of devices.

6.1.5.7 Charging for Device

With prior art mobile handheld tour devices, an End User typically currently pays for (or it is free to use) a handheld device. The present solution is free for a first-time user with an option to pay to continue.

6.2 The Invention: Tour By Numbers Mobile Tour Solution with Sound Innovation and Audio Text-To-Audio Translation Innovation for Mobile Tours In general, the present invention comprises the provision and use of an application with a multiple tour creation option that is hosted on a central platform ("WalknTours") to allow for easy access for users.

More particularly, the present invention comprises a novel method for providing the audio of a mobile tour to a user using a handheld device. In one form of the invention, audio is provided to the user by accessing the ear speaker of a cellphone while using location-based awareness of a tour site using GPS and/or Bluetooth Beacons. This provides an easy to create and manage mobile tour delivery platform. This novel method is applied to mobile audio tours and a tour creation system to allow for easy to create, use and manage mobile audio tours.

6.2.1 The Sound Innovation

The sound innovation of the present invention provides multiple ways for the end user to listen to the mobile application-based audio tour on their mobile device using an iOS or Android device. The present invention is specifically centered on mobile application-based tours that play location-based audio (i.e., mobile application-based tours that provide audio associated with a specific location) and is offered as a download from the Apple App Store or Google Play. A major innovation here is the use of the ear speaker, which is currently only used during a phone call, of a cellular phone for the purpose of playing audio from a mobile tour application.

In one preferred form of the present invention, the ear speaker may be leveraged in order to limit the volume of the sound emitted an End User's personal electronic device 25 as an audio file plays on the End User's personal electronic device 25. More particularly, mobile phones typically comprise two speakers: an "ear speaker" that is only used for making phone calls, and a "loud speaker" that projects the sound of the call when the speaker button is pressed on the mobile phone, or when music is played on the mobile phone. Currently, all mobile tours and audio played on mobile phones use the "loud speaker" and only calls access the ear speaker.

For the purposes of keeping the volume to a minimum and not disrupting other visitors, the present invention accesses and utilizes the "ear speaker" on mobile devices (iOS/Android). The present invention is intended to be used during mobile audio tours. Prior art mobile audio tours have not utilized the "ear speaker" of a cellphone for use during an audio tour, or any use outside of taking calls. Thus, the present invention significantly improves the indoor usage of a mobile device for an audio tour for mobile device users.

By way of example but not limitation, the following are scenarios in which the use of the ear speaker improves the audio mobile tour experience.

6.2.1.1 Indoors, e.g., Museums

Currently, when in a museum, if a user does not have headphones, then they have no choice but to use their loud speaker to listen to a self-guided audio tour. Use of a loud speaker is typically very disruptive to everyone in the vicinity of the user, particularly in an indoor space such as a museum. If large numbers of persons (e.g., 10 people) use their loud speaker to listen to a self-guided audio tour at the same time, it is difficult to hear the audio, and the ambient noise detracts from other visitors' experiences. For this reason, museums, libraries and many other indoor locations are not amenable to using mobile application-based self-guided audio tour solutions.

6.2.1.2 No Headphones

If the user is somewhere (inside or outside) and does not have their headphones, it is uncomfortable to use the loud speaker because everyone can hear what the user is listening to, use of the loud speaker is disruptive, and in loud environments the user cannot hear the audio from the loud speaker.

Also, the user has various choices to listen to audio on the user's mobile device, including but not limited to headphones and/or Bluetooth speakers or Bluetooth audio-enabled devices.

And the present invention enables use of interactive possibilities (see above) vis-à-vis audio delivered to the user.

The novel sound innovation of the present invention (i.e., use of the "ear speaker" rather than the "loud speaker" on a mobile device) may be applied in combination with the mobile tour by numbers-type system (i.e., a proprietary handset), and with mobile GPS location-based audio tours and Bluetooth Beacon location-based audio tours discussed in detail above. The tour by numbers system is detailed below.

6.3 Location-Based Awareness and Tour by Numbers Mobile Tour Developer System and Platform The present invention also comprises the provision and use of an audio text-to-audio translation feature. The audio text-to-audio translation innovation for self-guided mobile audio tours offers a Tour Creator an easy way to develop tours and to quickly add multiple (e.g., virtually unlimited) language choices to audio tours. The major innovation here for mobile audio tours is the ease of use in adding and generating multiple languages quickly.

With the present invention, the developer only has to add the dialogue for the point of interest (tour stop) and that dialogue is generated into different language audio files which may be played at the point of interest.

To clarify tour stop/point of interest: if the developer creates a mobile tour with 5 points of interest, the points of interest would be labeled as 1, 2, 3, 4 and 5. When the user enters point of interest/tour stop 5, the handheld device plays the audio for that point of interest/tour stop. If the user chooses Chinese, the audio for point of interest/tour stop 5 plays in Chinese. If they choose English, the audio for point of interest/tour stop 5 plays in English, etc.

The audio text-to-audio translation feature works as follows. The Tour Creator adds the Dialogue text of audio/video. The Dialogue text of audio/video (which is only in text form) is translated and played for the user in other languages. The Dialogue text is then pushed to a text API and translated to multiple languages (e.g., Spanish, Chinese, French, etc.). The number of languages is limitless, only limited to the API. The translation text is pushed to a voice API that converts the translation text into speech. The transformed speech (i.e., the converted translation text) is then used to generate an MP3 file. The end result is a plurality of possible audio files that can be played by the End User (i.e., one audio file for each language). The MP3 file is then associated to the language file in the tour. For example, with the Spanish tour, each location mp3 file is associated with a particular point of interest (tour stop) on the mobile tour. The associated MP3 file is then played when it is triggered. In the case of tour by numbers, playing is triggered when the End User enters the location number. For GPS-based tours, playing is triggered when the user's location triggers the GPS point. For Bluetooth Beacon-based tours, playing is triggered when the user enters the Bluetooth trigger location (i.e., the area of the Bluetooth Beacon).

The major benefit of the approach of the present invention is that the developer (i.e., the Tour Creator) can create many (e.g., nearly unlimited) language audio mobile tours with only a single text. The Tour Creator does not have to record each language individually and add it as a language option. The Tour Creator simply adds the text, and the software generates many languages automatically, thereby allowing the developer to create multi-language tours in seconds.

The location-based awareness and tour by numbers mobile tour developer system and platform of the present invention is an easy-to-use management system that allows the developer to quickly create and manage "tour by numbers" tours, as will hereinafter be discussed in further detail.

6.3.1 Step 1—Add Tour Details and Location

The first step according to the present invention is for the Tour Creator to enter tour details, and location, into the developer (i.e., the developer system and platform). This includes a description of the tour, tour information, length of the tour, etc., however, for the purposes of the mobile tour application, the most important aspect for the present invention is location. Entering the location into the developer creates an area near a GPS point (i.e., GPS coordinates) or near a Bluetooth Beacon that sets a distance from that point. The tour can only begin if the user is in that geographic location.

6.3.2 Step 2—Add Tour by Numbers Points of Interest

The Tour Creator then adds details for each point of interest. These details include, but are not limited to: Location name, Location number associated to the stop, Audio or video for location, Image to be displayed and shared, etc. The Tour Creator then adds the text Dialogue of audio/video. (This is the text-to-audio translation innovation for mobile tours discussed above). The Dialogue text is then pushed to a text API and translated to multiple languages (e.g., Spanish, Chinese, French, etc.). The translation text is pushed to a voice API that converts it into speech. The speech is then generated into an MP3 file. That MP3 file is then associated to the language file in the tour (i.e., the MP3 file is then associated with a specific point of interest/tour stop location).

Figure 22:
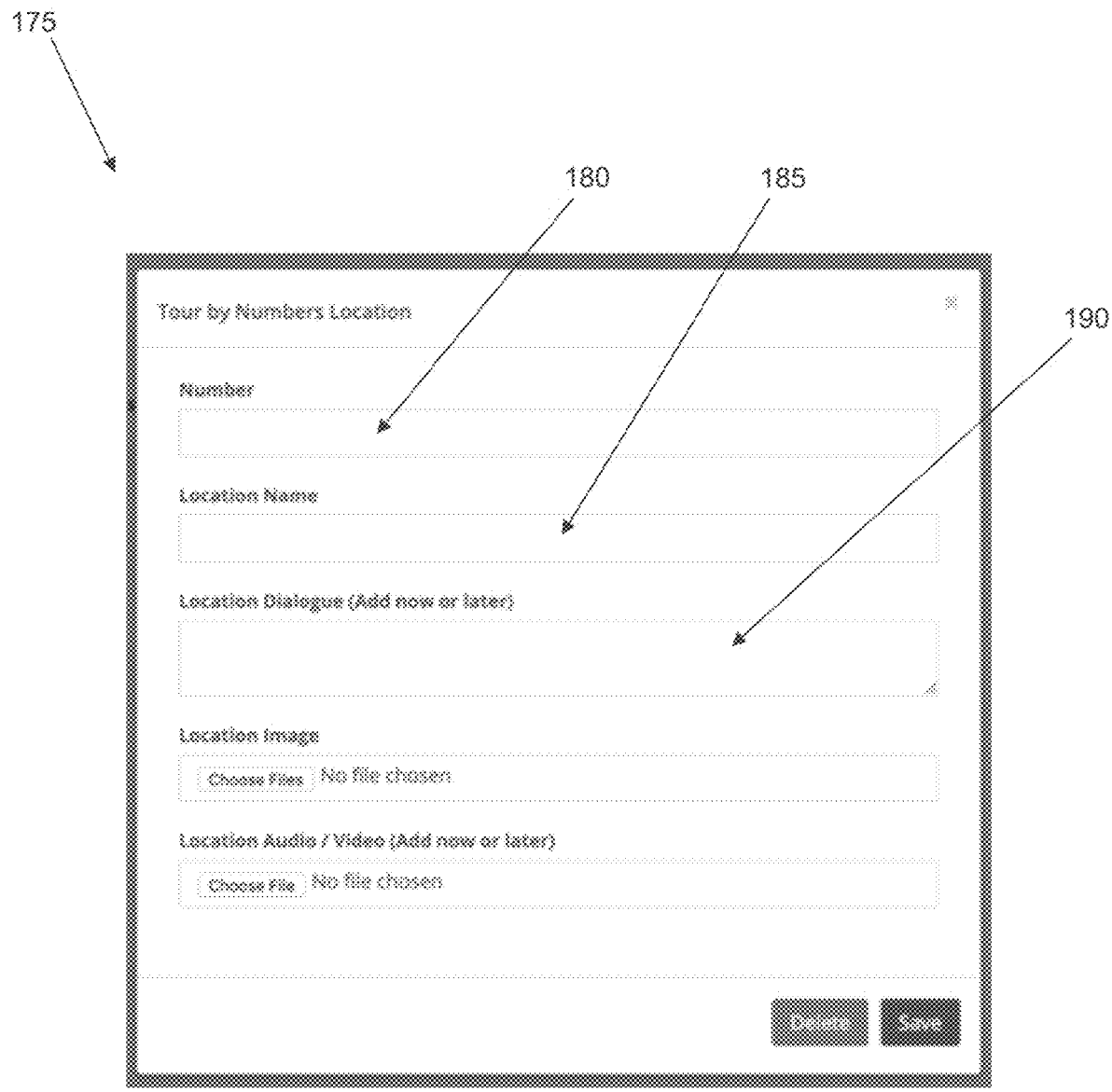
FIGS. 22-24 are schematic views showing aspects of a novel application formed in accordance with the present invention.

FIG. 22 shows an exemplary tour by numbers entry 175 in the mobile tour developer system of the present invention. The Tour Creator fills in field 180 to assign the order number of the location on the tour path and field 185 to assign the name of the location. The Tour Creator adds the appropriate dialog to be played by audio at that particular location in field 190 as plain text (as noted above, the text is converted by an API to multiple languages so that an End User may select the desired language for the tour and hear the location dialogue in that language). The End User can then select a Location image to display to the End User when the End User arrives at the specified location (or previews the tour path) and/or the Tour Creator may add a location audio/video file to play when the End User arrives at the specified location.

6.3.3 Step 3—Publish

The tour is then published into an app (e.g., "WalknTours") that is able to process location-based mobile tours created in our mobile tour development system as detailed above. This is accomplished by, for example, generating the tour as the aforementioned tour instruction file 30, and then storing tour instruction file 30 in tour database 20 on central server 15. The tour instruction file 30 can then be accessed by a proprietary app such as the aforementioned WalknTours App, or the tour instruction file may be utilized by a third party app in the manner discussed above.

6.3.4 Step 4—Add/Modify

To add or modify a tour number location, or to add a new tour number location, the Tour Creator would simply have to repeat Step 2 (see above) and publish the newly-saved tour.

Figure 23:
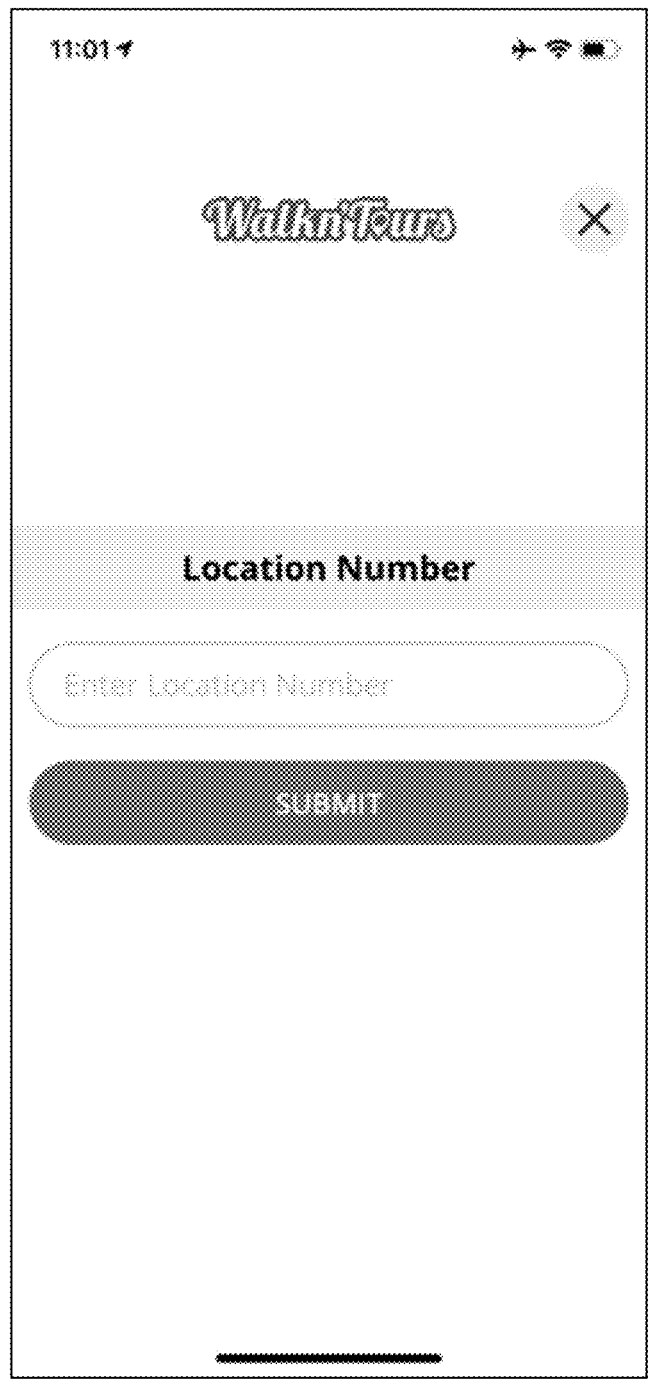

An exemplary interface for End Users to enter location number on a mobile device is shown in FIG. 23.

Figure 24:
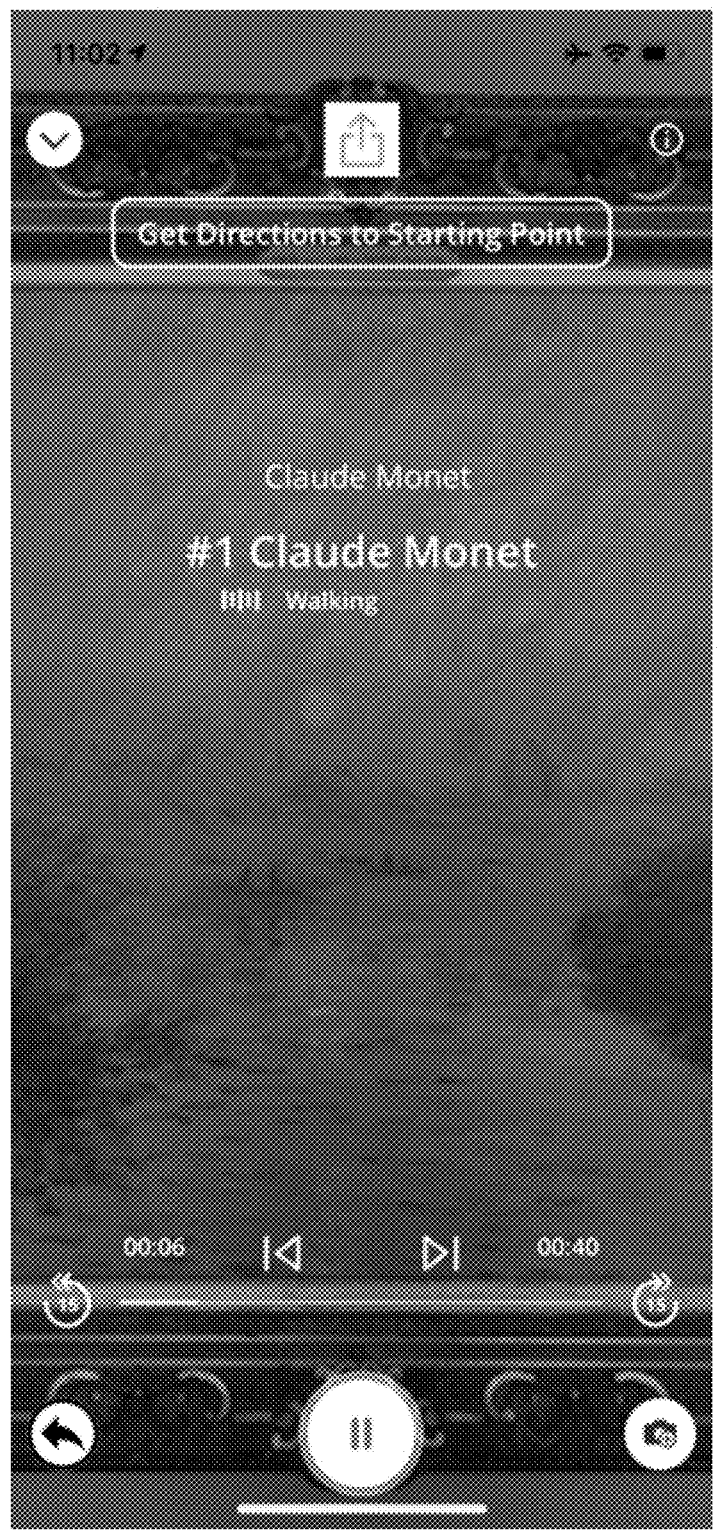

An exemplary audio/image that plays/appears on the mobile device after entering the location number is shown in FIG. 24.

6.4. The Solution Offered by the Present Invention Solves Various Problems, including but not limited to:

6.4.1 Uploading Files/Management

The present invention allows a Tour Creator to easily upload mobile tours without having to update each device individually (i.e., because the tour instruction file 30 is stored on central server 15). The Tour Creator only needs to update the app, which would then be automatically updated on every smartphone. This saves money on human resources.

6.4.2 Adding New Tour Locations

Developers (i.e., Tour Creators) simply add a new tour number location to an existing tour and that updates the mobile tour in the app (which is loaded on every smartphone). This saves money on human resources 6.4.3 Additional Benefits In addition to the foregoing, the present invention also allows the Tour Creator to play audio or video, eliminates the need to collect IDs at the time of the tour (as is necessary when lending out proprietary handsets); there is no need to collect IDs when utilizing the present invention inasmuch as visitors would use their personal devices with the downloaded app. This saves money on human resources.

And the present invention also eliminates lost/stolen/broken handsets. There is no need to manage devices inasmuch as the visitors would use their personal devices with the downloaded app. This Saves money on devices.

And the present invention also eliminates the need to charge batteries of devices lent out to visitors, inasmuch as the visitors can use their own personal devices with the downloaded app. This saves revenue on human resources and electricity. And since the visitor is using their own personal device, there is no need to charging devices to be lent out to visitors. Hence, the location of the tour itself (e.g., museum) would not need any on-site staff to handle devices lent out to visitors. The present invention provides a solution to accept payment in the app itself. This saves money on human resources 7. "Virtual" Tour Although the present invention has been described as facilitating a self-guided audio tour wherein the End User walks along the tour path, it should also be appreciated that the present invention facilitates the creation of "virtual" self-guided audio tours as well.

More particularly, with this form of the invention, the End User is a "virtual" End User and the tour path that is created exists as a "virtual" (i.e., digital) tour path. The digitized visual element of the "virtual" tour may be generated in ways well-known in the art (e.g., in the manner of a Google "street view" path). With this form of the invention, the digital "virtual" End User follows the tour path between virtual start and end points, and triggers the playing of audio corresponding to particular locations along the tour path when the digital "virtual" End User enters those locations on the digital path.

As with the real-world tour paths discussed above, the Tour Creator has the option of creating various interest locations/exhibits/ADTs along the virtual tour path that trigger the playing of assigned audio files (e.g., to provide the End User with details about the location). Similarly, the Tour Creator can create "Dig Deeper" optional extensions to the digital tour path in the same manner as the Tour Creator creates "Dig Deeper" optional extensions to the real-world tour path discussed above.

Similarly, the novel "dynamic" audio features discussed above with respect to "real-world" tour paths may also be incorporated into "virtual" (i.e., digital tour paths). Since an IMU is not necessary for a "virtual" tour path because there is no Earth gravity on a digital tour path to measure, the computer instead merely tracks the orientation of the virtual End User and "dynamic" audio is delivered to the End User as it would be if the End User were on the real-world tour path.

8. Novel System for Creating and Delivering a Tour to an End User

As noted above, the present invention provides a new and improved way for a Tour Creator to design novel audio tours and a new and improved way to deliver novel audio tours to the personal electronic device (e.g., a smartphone) of a user which avoids the difficulties of the prior art.

One important aspect of the present invention is that it enables a Tour Creator to create a mobile tour instruction file 30 that defines the parameters and features of a particular novel audio tour, and which can be stored on central server 15 (e.g., in tour database 20), such that any user with a portable electronic device 25 (e.g., a smartphone), equipped with a wireless transceiver 45 for wirelessly receiving and/or transmitting data from a remote source (e.g., the Internet), location finding electronics (e.g., a GPS receiver 50 and/or a Bluetooth transceiver 55) and acoustic output means 40 (e.g., a speaker, headphones, etc.) can wirelessly connect with central server 15 and run tour instruction file 30 on the End User's own personal electronic device 25 so that the End User can engage in the novel audio tour.

To this end, the present invention provide a simple user interface for creating mobile tour instruction file 30 that is common to every end user and does not require the end user to install specialized software.

Figure 25:
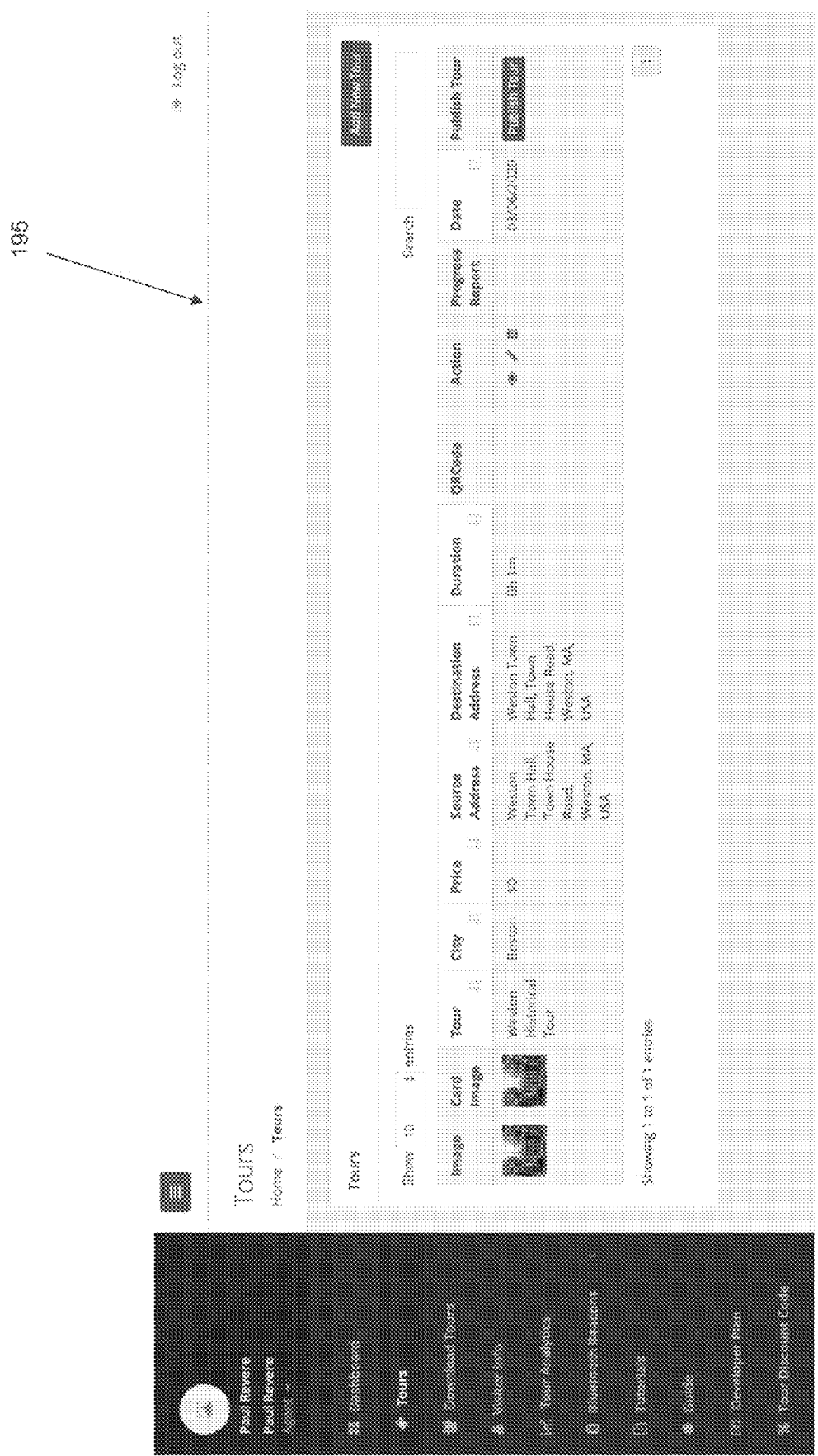

Looking now at FIG. 25, there is shown a web-based interface 195 for generating mobile tour instruction file 30. Interface 195 can be accessed by a user via a common web browser (e.g., via the Internet). Web-based interface 195 allows a Tour Creator to define a new mobile tour and the tour path for the tour, associate images and/or audio with the new mobile tour (and locations/exhibits on the tour), define exhibits/locations and their relative position (i.e., vis-à-vis other exhibits/locations on the tour), set prices for accessing the mobile tour, etc.

In one preferred form the invention, web-based interface 195 allows a Tour Creator to create a tour instruction file 30 defined by a master tour record 200 (which allows the Tour Creator to input details concerning the parameters of the over all tour into tour instruction file 30), a tour storyboard record 205 (which allows the Tour Creator to place tour locations on a map as well to lay out the associated tour path), and a plurality of location records 207A, 207B, etc. which permits the Tour Creator to input details concerning the parameters of individual locations/exhibits/ADTs along the tour path, as will hereinafter be discussed in further detail.

Figure 26:
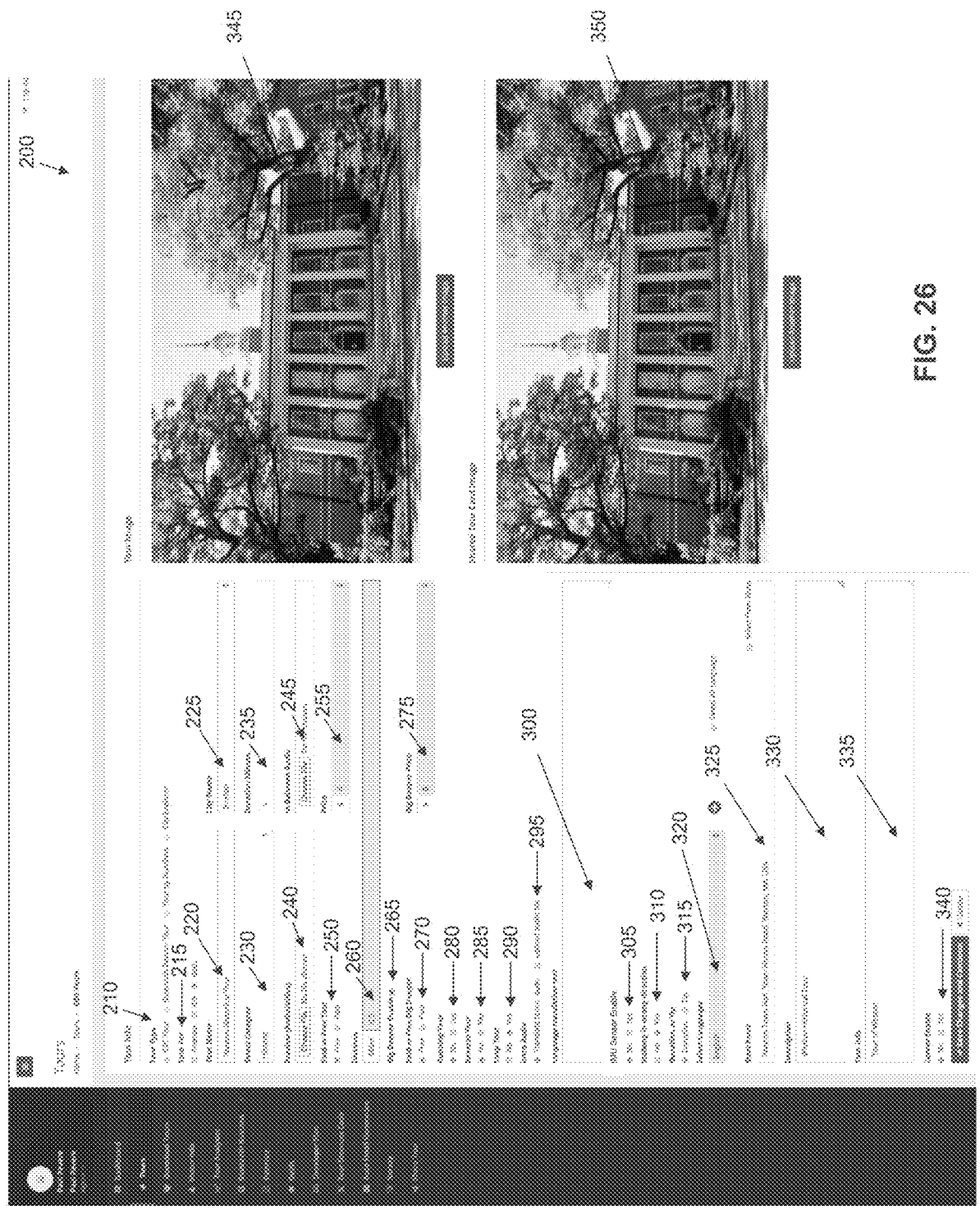
FIGS. 26-28 are schematic views showing a novel tour creator feature for facilitating the creation of self-guided audio tours using the novel mobile tour delivery system of the present invention.

More particularly, and looking now at FIG. 26, there is shown an exemplary master tour record 200. A tour type field 210 permits the Tour Creator to select the type of tour (e.g., GPS tour, Bluetooth Beacon tour, tour-by-numbers tour, virtual tour, etc.) by selecting the appropriate radio button. A tour output selector 215 allows the Tour Creator to select the desired output operating system for running the tour instruction file 30 (e.g., Android, iOS, both Android and iOS, etc.) by selecting an appropriate radio button. A tour name field 220 allows the Tour Creator to input a name for the tour that is being created (e.g., "Weston Historical Tour"). A tour city name field 225 allows the Tour Creator to assign a city name to the tour (e.g., via a drop-down menu). A tour category field 230 allows the tour creator to assign the tour to a particular category (e.g., historic, haunted, local, etc.), e.g., via a drop-down menu. A tour duration field 235 allows a Tour Creator to assign an estimated time for completing the tour. A "tour preview field" 240 allows a Tour Creator to upload a media file (e.g., an appropriate audio file, video file, etc.) that plays as a preview when the End User is reviewing the tour. A "tour in between audio field" 245 allows a Tour Creator to upload a media file (e.g., an appropriate audio file, video file, etc.) that plays during the Tour when the End User is between locations set out on the tour path. A tour "paid or free" field 250 allows the Tour Creator to set a price for the tour in a price field 255 that is to be paid by the End User if they wish to undertake the tour, or allows the Tour Creator to make the tour "free". A tour distance field allows the Tour Creator to set the approximate distance of the tour (e.g., in miles, kilometers, etc.) so that the End User can see the approximate distance covered by the tour. A "Dig Deeper enable field" 265 allows the Tour Creator to enable or disable the optional Dig Deeper extension feature (e.g., via checking a box). If the Dig Deeper extension is enabled, a Dig Deeper "paid or free" field 270 allows the Tour Creator to set a price for the tour in a price field 275 that is to be paid by the End User if they wish to undertake the Dig Deeper extension on the tour, or allows the Tour Creator to make the Dig Deeper extension "free".

The type of tour being created by the Tour Creator may be specified in master tour record 200 by selecting the appropriate radio button to assign the tour to one selected from the group consisting of a "Running Tour" field 280, a "Reverse Tour" field 285, and a "Loop Tour" field 290.

An "Intro Audio" field 295 allows the Tour Creator to either upload an introductory media file (e.g., an audio file, a video file, etc.) to be played when the End User starts the tour or, alternatively, to input text into a "Language translation text" field 300 that is then converted into audio as discussed above. An "IMU sensor enable" field 305 allows the Tour Creator to enable special audio features for the audio that is delivered to the End User, e.g., such as selecting a radio button to enable the use of headphones that comprise an integrated inertial measurement unit (IMU) for determining the orientation of the user, whereby to enable the audio features discussed above. A "walking in wrong direction" field 310 allows the Tour Creator to either permit or prohibit walking the tour path in the opposite direction to the direction intended by the Tour Creator. A "donation or tip" field 315 allows the Tour Creator to specify whether the End User should be prompted to give a donation or a tip if the End User elects to undertake the tour. A languages field 320 allows the Tour Creator to specify which languages the tour is to be delivered in.

Still looking at FIG. 26, a Start Point field 325 allows the Tour Creator to specify the starting point for the tour that is being created. A tour description field 330 allows the Tour Creator to provide an overall description of the tour, and a tour info field 335 allows the Tour Creator to provide additional information regarding the tour that is being created. A tour survey field 340 allows the Tour Creator to specify whether the End User will be prompted to take a survey during/after the tour. A tour image field 345 allows the Tour Creator to specify a particular image to be associated with the a tour that is being created, and a tour card image field 350 allows the Tour Creator to specify a particular image that is associated with the tour instruction file 30 for the particular tour that is being created and which can be easily shared on social media at the completion of the tour (e.g., to help the End User identify a particular tour stored in central tour database 20).

Figure 27:
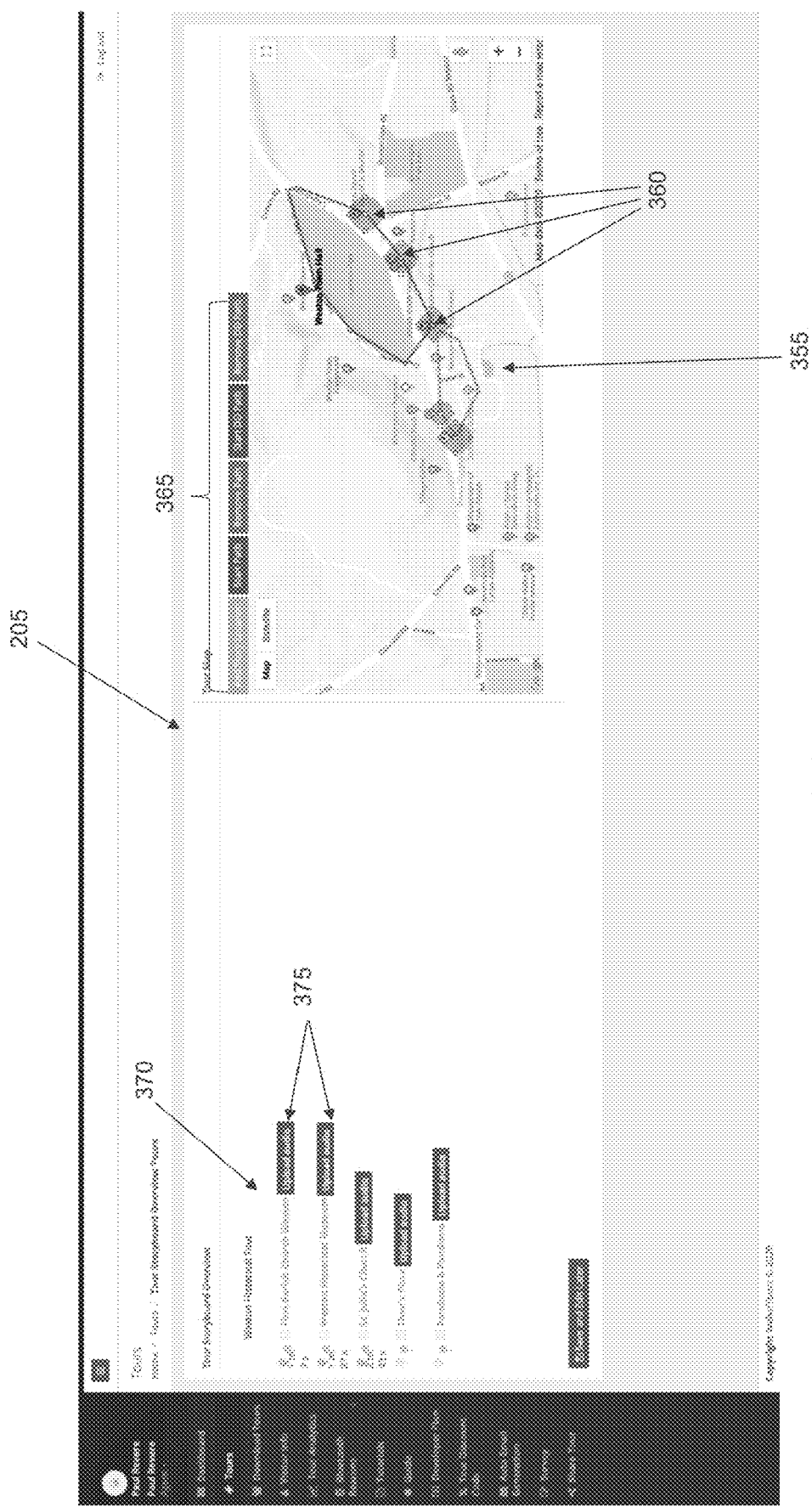

Looking next at FIG. 27, there is shown an exemplary tour storyboard record 205. Tour storyboard record 205 preferably comprises a tour map 355 (which may be a map imported from a third party such as Google Maps, etc.). Tour map 355 is preferably an interactive map that allows the Tour Creator to place location points 360 (which correspond to locations/exhibits/ADTs that are to be visited along the tour path), e.g., by clicking on the map to place the location point. A plurality of control buttons 365 are provided to allow the Tour Creator to place the tour path and/or to place the path for Dig Deeper extensions (if enabled). It should be appreciated that the particular control buttons 365 that appear on tour storyboard record 205 depend upon the particular features that the Tour Creator selects to enable in master tour record 200 (e.g., if the Dig Deeper extension is not enabled, buttons to place the Dig Deeper extension tour path may be hidden and/or disabled). After the Tour Creator has specified the tour path and assigned the tour location points 360 for the locations/exhibits/ADTs on the tour path, tour storyboard record 205 automatically generates a tour overview 370 that shows the distances between the specified tour points 360, and which also allows the Tour Creator to quickly and easily upload associated media files for each tour point 360 (e.g., by clicking the associated "Upload audio" button 375 associated with each tour point 360).

Double-clicking on any particular tour point 360 on tour map 355 allows the Tour Creator to access the particular location record 207A, 207B, etc. associated with that particular tour point. More particularly, and looking now at FIG. 28, there is shown an exemplary location record 207A associated with a particular tour point 360. A location type field 380 allows the Tour Creator to specify the type of audio to be associated with that particular tour point 360 (e.g., path audio or Dig Deeper audio). A Bluetooth Beacon audio field 385 allows the Tour Creator to specify whether the audio for that particular tour point 360 is associated with a Bluetooth Beacon. An audio style choice field 390 allows the Tour Creator to specify what type of audio is to be played for the End User for that particular tour point 360 (e.g., play until end, play until next trigger, navigation audio, spatial audio until end, spatial audio until next trigger, etc.). A position field 395 allows the Tour Creator to assign an order number for a particular location on the tour path (e.g., 1, 2, 3, 4, etc.). A location name field 400 allows the Tour Creator to specify a name for the particular tour point 360 associated with that particular location record 207A. A location dialogue field 405 allows the Tour Creator to specify dialogue to be displayed to the End User when the End User is at that particular tour location point 360. A location image field 410 allows the Tour Creator to upload an image that will be associated with the particular tour location point 360 associated with that particular location record 207A (e.g., to display to the End User during the tour). A location audio text field 415 allows the Tour Creator to input text to be converted into an audio file for delivery to the End User when the End User is at the particular tour location point 360 associated with that particular location record 207A (i.e., the text can be converted to audio in the manner discussed above, and/or converted into other languages as discussed above). The Tour Creator may select whether the text added to location audio text field 415 is to be converted to audio or whether the Tour Creator instead will upload an audio file, by selecting the appropriate radio button 420.

Figure 28:
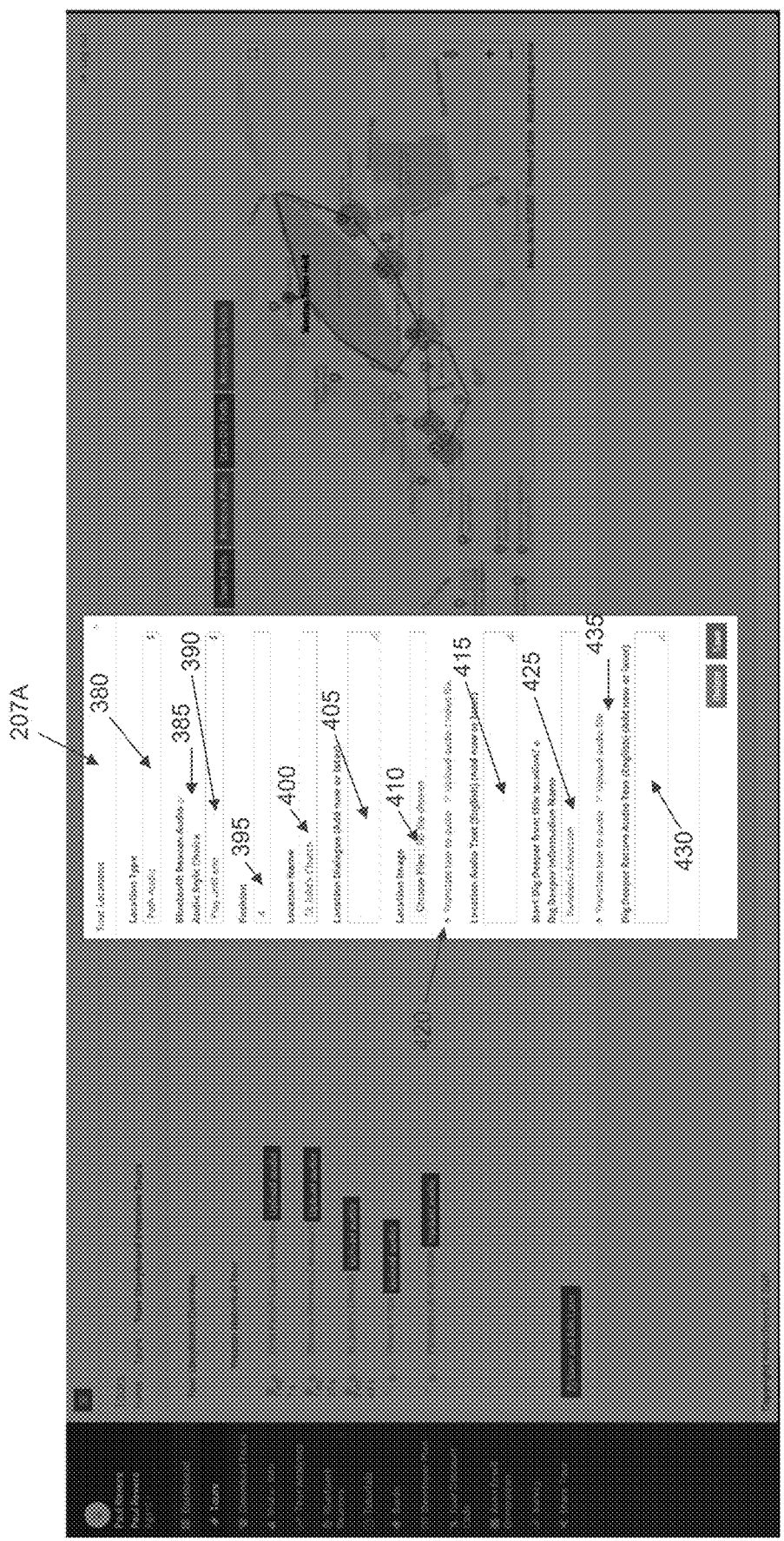

Still looking at FIG. 28, if the Dig Deeper extension option has been enabled, and if the tour location point 360 associated with that particular location record 207A is the beginning of a Dig Deeper extension path, the Tour Creator may specify the name of the Dig Deeper extension path by filling in the Dig Deeper information name field 425. A Dig Deeper return audio text field 430 allows the Tour Creator to input text to be converted into an audio file for delivery to the End User when the End User returns to the particular tour location point 360 associated with that particular location record 207A (i.e., the text can be converted to audio in the manner discussed above, and/or converted into other languages as discussed above) after engaging in a Dig Deeper extension (i.e., so that the End User does not have to again listen to the originally-played audio file associated with that particular tour location point 360 after completing the Dig Deeper extension). The Tour Creator may select whether the text added to Dig Deeper return audio text field 430 is to be converted to audio or whether the Tour Creator instead will upload an audio file, by selecting the appropriate radio button 435.

Thus it will be appreciated that web-based interface 195 allows a Tour Creator to create a tour comprising any of the various features discussed above (e.g., a standard tour path, a loop tour path, a reverse tour path, a Dig Deeper extension option, Bluetooth Beacon triggers, etc.), and to set the parameters of the tour (e.g., how large the location trigger is around a particular GPS coordinate, etc.), as well as to provide the appropriate media (e.g., audio files, text, etc.) to be played/displayed to the user during the tour. Web-based interface 195 also allows the Tour Creator to customize various aspects of the tour, e.g., by defining the "dynamic"

acoustic effects discussed above and providing appropriate audio files to play, specifying the order number of locations/exhibits, etc.

An important feature of web-based interface 195 is that the tour instruction file 30 that is created may be downloaded and used by various applications, and is not limited to proprietary software/apps. As a result, tour instruction file 30 may be used by third-party apps (e.g., hotel apps, museum apps, sports apps, etc.) to provide tours, without requiring the end user to download or install proprietary software. This allows developers to utilize tour instruction file 30 to run tours through existing third-party apps.

Modifications of the Preferred Embodiments

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. A system for delivering a self-guided audio tour to an end user, said system comprising:
    a central server comprising:
        a database;
        a tour instruction file stored in said database, said tour instruction file comprising:
            a tour type;
            a tour path comprising a plurality of tour points;
            an order of said tour points on said tour path;
            location information identifying the real-world position of each of said tour points on said tour path; and
            data to be delivered to the end user for each of said tour points on said tour path; and
    a personal electronic device comprising:
        a central processing unit;
        a wireless transceiver in communication with said central processing unit for wirelessly communicating with said central server;
        a position determination unit in communication with said central processing unit for identifying the real-world position of said personal electronic device;
        a display in communication with said central processing unit;
        at least one acoustic output unit in communication with said central processing unit; and
        a software app running on said central processing unit for:
            using said position determination unit to identify the real-world position of said personal electronic device;
            comparing said real-world position of said personal electronic device with said tour path to determine if said personal electronic device is located at one of said plurality of tour points;
            if the end user is at one of said plurality of tour points, and if the end user reached that tour point following said order of said tour points on said tour path, delivering the data from said tour instruction file for that tour point;
    wherein said tour path is a standard path, and further wherein said standard path is defined by a start tour point, an end tour point and at least one intermediate tour point located therebetween; and
    wherein at least two intermediate tour points are disposed between said start tour point and said end tour point;
    wherein each of said at least two intermediate tour points are assigned a sequential order number;
    and further wherein when the end user arrives at one of said at least two intermediate tour points, data for that intermediate tour point is delivered to the end user if the order number for that intermediate tour point is the next sequential order number, and data for that intermediate tour point is not delivered to the end user if the order number is not the next sequential order number.

2. A system according to claim 1 wherein said start tour point, said end tour point and said at least one intermediate tour point are defined by one selected from the group consisting of global positioning system (GPS) coordinates and a Bluetooth beacon.

3. A system according to claim 1 wherein at least one of said start tour point, said end tour point and said at least one intermediate tour point is defined by global positioning system (GPS) coordinates, and at least one of said start tour point, said end tour point and said at least one intermediate tour point is defined by a Bluetooth beacon.

4. A system according to claim 1 wherein said tour path comprises an optional extension point;
    wherein said optional extension point designates the start of an optional tour path extension; and
    wherein, when the end user arrives at said optional extension point, the end user is given the option of including said optional tour path extension into said tour path.

5. A system according to claim 4 wherein said optional extension point is defined by one selected from the group consisting of global positioning system (GPS) coordinates and a Bluetooth beacon.

6. A system according to claim 4 wherein said optional tour path extension comprises at least one additional tour point, and further wherein data is delivered to the end user when the end user is located at said at least one additional tour point.

7. A system according to claim 6 wherein said at least one additional tour point is defined by one selected from the group consisting of global positioning system (GPS) coordinates and a Bluetooth beacon.

8. A system according to claim 1 wherein the data delivered to the end user comprises at least one selected from the group consisting of an audio file, presentation parameters for an audio file, a video file, presentation parameters for a video file, a text file, a machine-translation of a text file, an image file and presentation parameters for an image file.

9. A system according to claim 1 wherein the data delivered to the end user comprises audio data in the form of an audio recording played on said at least one acoustic output unit.

10. A system according to claim 9 wherein said audio recording for a given tour point is played on said at least one acoustic output unit until the end of the audio recording, even if the end user has moved to the next tour point on said tour path.

11. A system according to claim 9 wherein said audio recording for a given tour point is played on said at least one acoustic output unit until the end user has moved to the next tour point on said tour path, whereupon said audio recording stops playing on said acoustic output unit and a new audio recording for the new tour point is played on said acoustic output unit.

12. A system according to claim 1 wherein, when the end user is moving from any one tour point on said tour path to any other tour point on said tour path, a navigational audio recording is delivered to the end user by said acoustic output unit so as to provide the end user with at least one of (i) directions for moving from the current tour point on said tour path to the next tour point on said tour path, (ii) story information pertaining to the next tour point, (iii) story information pertaining to another tour point, and (iv) other information which may be of interest to the end user either during or after participating in the self-guided audio tour.

13. A system according to claim 12 wherein, when a navigational audio recording is being delivered to the end user, any other audio data which is being delivered to the end user is paused.

14. A system according to claim 1 wherein, when the end user has received the data to be delivered to the end user for that tour point, the end user receives an invitation to receive more data about that tour point.

15. A system according to claim 1 wherein the data comprises audio data presented by said at least one acoustic output unit and visual data presented by said display.

16. A system according to claim 1 wherein said start tour point and said end tour point are at the same real-world position, and further wherein the data to be delivered to the end user at the start tour point is different than the data to be delivered to the end user at the end tour point.

17. A system according to claim 1 wherein said personal electronic device comprises at least one selected from the group consisting of smartphones, tablets, portable computers, smartwatches, smartglasses, and headphones, either alone or in combination with one another.

18. A system according to claim 17 wherein said personal electronic device comprises headphones having an inertial measurement unit (IMU) configured for detecting taps, swipes, motion or touch, and further wherein said software app is configured to interpret such taps, swipes, motion or touch as an input selection by the end user.

19. A system according to claim 1 wherein said personal electronic device further comprises an inertial measurement unit (IMU) for determining the real-world orientation of the end user.

20. A system according to claim 19 wherein the data to be delivered to the end user at a given tour point varies according to the real-world orientation of the end user at that given tour point.

21. A system according to claim 20 wherein the data comprises audio data in the form of an audio recording played on said at least one acoustic output unit audio, and further wherein the volume of the audio recording is varied depending upon the orientation of the end user.

22. A system according to claim 20 wherein the data comprises stereo audio data in the form of audio delivered via two channels, and further wherein the volume in each of the two channels is varied according to the orientation of the end user.

* * * * *